(12) United States Patent
Kurian et al.

(10) Patent No.: US 10,103,936 B2
(45) Date of Patent: Oct. 16, 2018

(54) COMPUTERIZED RESOURCE REALLOCATION SYSTEM FOR TRANSFERRING RESOURCE BLOCKS BASED ON CUSTODIAN EVENT

(71) Applicant: Bank of America Corporation, Charlotte, NC (US)

(72) Inventors: Manu Jacob Kurian, Dallas, TX (US); Victoria L. Dravneek, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 63 days.

(21) Appl. No.: 15/188,696

(22) Filed: Jun. 21, 2016

(65) Prior Publication Data

US 2017/0366394 A1     Dec. 21, 2017

(51) Int. Cl.
*H04L 12/24* (2006.01)
*H04L 29/08* (2006.01)
*H04L 29/06* (2006.01)

(52) U.S. Cl.
CPC .......... *H04L 41/0803* (2013.01); *H04L 63/10* (2013.01); *H04L 67/10* (2013.01); *H04L 67/12* (2013.01)

(58) Field of Classification Search
CPC ................ H04L 63/10; H04L 67/10
See application file for complete search history.

(56) References Cited

U.S. PATENT DOCUMENTS

| | | |
|---|---|---|
| 5,717,923 A | 2/1998 | Dedrick |
| 5,761,648 A | 6/1998 | Golden et al. |
| 5,842,185 A | 11/1998 | Chancey et al. |
| 5,848,396 A | 12/1998 | Gerace |
| 5,870,770 A | 2/1999 | Wolfe |
| 5,907,830 A | 5/1999 | Engel et al. |
| 5,911,135 A | 6/1999 | Atkins |
| 5,933,811 A | 8/1999 | Angles et al. |
| 6,006,252 A | 12/1999 | Wolfe |
| 6,009,411 A | 12/1999 | Kepecs |

(Continued)

FOREIGN PATENT DOCUMENTS

CN     104283967 A     1/2015

OTHER PUBLICATIONS

Friedman, Jack P., Dictionary of Business Terms, 2000, Barron's Educational Series, Inc., 3rd edition, 225.

(Continued)

*Primary Examiner* — Lashonda T Jacobs
(74) *Attorney, Agent, or Firm* — Michael A. Springs; Moore & Van Allen PLLC; Peter B. Stewart

(57) ABSTRACT

Disclosed is a resource reallocation system. The system typically includes a processor, a memory, and a resource reallocation module stored in the memory. The system is typically configured for: identifying resources of a custodian; allocating the resources into one or more resource blocks; linking a resource transfer protocol to each resource block, each resource transfer protocol being associated with a particular custodian event; monitoring custodian data; determining that a custodian event has occurred based on monitoring the custodian data; and, in response to determining that the custodian event has occurred, automatically initiating one of the resource transfer protocols.

18 Claims, 7 Drawing Sheets

(56) References Cited

U.S. PATENT DOCUMENTS

| | | |
|---|---|---|
| 6,009,413 A | 12/1999 | Webber et al. |
| 6,041,309 A | 3/2000 | Laor |
| 6,055,573 A | 4/2000 | Gardenswartz et al. |
| 6,076,069 A | 6/2000 | Laor |
| 6,223,163 B1 | 4/2001 | Van Luchene |
| 6,263,351 B1 | 7/2001 | Wolfe |
| 6,282,567 B1 | 8/2001 | Finch, II et al. |
| 6,292,786 B1 | 9/2001 | Deaton et al. |
| 6,292,813 B1 | 9/2001 | Wolfe |
| 6,317,718 B1 | 11/2001 | Fano |
| 6,321,208 B1 | 11/2001 | Barnett et al. |
| 6,330,543 B1 | 12/2001 | Kepecs |
| 6,332,126 B1 | 12/2001 | Peirce et al. |
| 6,336,099 B1 | 1/2002 | Barnett et al. |
| 6,336,131 B1 | 1/2002 | Wolfe |
| 6,341,305 B2 | 1/2002 | Wolfe |
| 6,349,290 B1 | 2/2002 | Horowitz et al. |
| 6,385,592 B1 | 5/2002 | Angles et al. |
| 6,434,534 B1 | 8/2002 | Walker et al. |
| 6,505,168 B1 | 1/2003 | Rothman et al. |
| 6,611,814 B1 | 8/2003 | Lee et al. |
| 6,615,184 B1 | 9/2003 | Hicks |
| 6,622,174 B1 | 9/2003 | Ukita et al. |
| 6,678,685 B2 | 1/2004 | McGill et al. |
| 6,782,370 B1 | 8/2004 | Stack |
| 6,853,291 B1 | 2/2005 | Aisa |
| 6,865,545 B1 | 3/2005 | Epstein et al. |
| 6,906,617 B1 | 6/2005 | Van der Meulen |
| 6,925,444 B1 | 8/2005 | McCollom et al. |
| 6,937,995 B1 | 8/2005 | Kepecs |
| 7,024,374 B1 | 4/2006 | Day et al. |
| 7,043,526 B1 | 5/2006 | Wolfe |
| 7,096,193 B1 | 8/2006 | Beaudoin et al. |
| 7,099,832 B2 | 8/2006 | Walker et al. |
| 7,124,096 B2 | 10/2006 | Dutta et al. |
| 7,127,414 B1 | 10/2006 | Awadallah et al. |
| 7,162,443 B2 | 1/2007 | Shah |
| 7,181,488 B2 | 2/2007 | Martin et al. |
| 7,225,167 B2 | 5/2007 | Hind et al. |
| 7,231,357 B1 | 6/2007 | Shanman et al. |
| 7,236,942 B1 | 6/2007 | Walker et al. |
| 7,246,310 B1 | 7/2007 | Wolfe |
| 7,249,058 B2 | 7/2007 | Kim et al. |
| 7,254,548 B1 | 8/2007 | Tannenbaum |
| 7,257,604 B1 | 8/2007 | Wolfe |
| 7,299,007 B2 | 11/2007 | Eskin |
| 7,302,429 B1 | 11/2007 | Wanker |
| 7,302,638 B1 | 11/2007 | Wolfe |
| 7,315,834 B2 | 1/2008 | Martineau et al. |
| 7,324,965 B2 | 1/2008 | Martineau et al. |
| 7,340,419 B2 | 3/2008 | Walker et al. |
| 7,356,490 B1 | 4/2008 | Jacobi et al. |
| 7,386,477 B2 | 6/2008 | Fano |
| 7,398,248 B2 | 7/2008 | Phillips et al. |
| 7,412,604 B1 * | 8/2008 | Doyle ............... G07C 9/00158 713/186 |
| 7,433,874 B1 | 10/2008 | Wolfe |
| 7,464,050 B1 | 12/2008 | Deaton et al. |
| 7,472,088 B2 | 12/2008 | Taylor et al. |
| 7,490,056 B2 | 2/2009 | Nash |
| 7,512,551 B2 | 3/2009 | Postrel |
| 7,536,385 B1 | 5/2009 | Wolfe |
| 7,552,080 B1 | 6/2009 | Willard et al. |
| 7,578,435 B2 | 8/2009 | Suk |
| 7,593,862 B2 | 9/2009 | Mankoff |
| 7,599,850 B1 | 10/2009 | Laor |
| 7,606,736 B2 | 10/2009 | Martineau et al. |
| 7,860,792 B1 | 12/2010 | Magruder et al. |
| 7,925,579 B1 | 4/2011 | Flaxman et al. |
| 8,042,178 B1 | 10/2011 | Fisher et al. |
| 8,234,194 B2 | 7/2012 | Mele et al. |
| 8,301,558 B2 | 10/2012 | Marshall et al. |
| 8,316,237 B1 | 11/2012 | Felsher et al. |
| 8,442,894 B2 | 5/2013 | Blackhurst et al. |
| 8,495,072 B1 | 7/2013 | Kapoor et al. |
| 8,930,265 B2 | 1/2015 | Blackhurst et al. |
| 8,984,113 B2 | 3/2015 | Li et al. |
| 9,009,828 B1 | 4/2015 | Ramsey et al. |
| 9,032,077 B1 * | 5/2015 | Klein .................... H04L 29/08 370/395.21 |
| 9,043,879 B1 | 5/2015 | Reeves et al. |
| 9,104,189 B2 | 8/2015 | Berges Gonzalez et al. |
| 9,106,615 B2 | 8/2015 | Grossman |
| 9,338,181 B1 | 5/2016 | Burns et al. |
| 9,411,982 B1 * | 8/2016 | Dippenaar .......... G06F 21/6245 |
| 9,743,272 B1 * | 8/2017 | Ogrinz ................... H04W 8/22 |
| 9,775,131 B2 * | 9/2017 | Winand .............. H04W 68/005 |
| 9,843,624 B1 | 12/2017 | Taaghol et al. |
| 9,874,923 B1 | 1/2018 | Brown et al. |
| 9,946,571 B1 | 4/2018 | Brown et al. |
| 2002/0032626 A1 | 3/2002 | DeWolf et al. |
| 2002/0049624 A1 | 4/2002 | Raveis, Jr. |
| 2002/0052803 A1 | 5/2002 | Amidhozour et al. |
| 2002/0062249 A1 | 5/2002 | Iannacci |
| 2002/0072975 A1 | 6/2002 | Steele et al. |
| 2002/0091571 A1 | 7/2002 | Thomas et al. |
| 2002/0114433 A1 | 8/2002 | Katou et al. |
| 2002/0143564 A1 | 10/2002 | Webb et al. |
| 2002/0190118 A1 | 12/2002 | Davenport et al. |
| 2004/0010462 A1 | 1/2004 | Moon et al. |
| 2004/0122736 A1 | 6/2004 | Strock et al. |
| 2004/0192339 A1 | 9/2004 | Wilson et al. |
| 2004/0226995 A1 | 11/2004 | Smith |
| 2004/0230593 A1 | 11/2004 | Rudin et al. |
| 2004/0249768 A1 | 12/2004 | Kontio et al. |
| 2005/0015624 A1 | 1/2005 | Ginter et al. |
| 2005/0039053 A1 | 2/2005 | Walia |
| 2005/0075975 A1 | 4/2005 | Rosner et al. |
| 2005/0171845 A1 | 8/2005 | Halfman et al. |
| 2005/0173517 A1 | 8/2005 | Suk et al. |
| 2005/0177437 A1 | 8/2005 | Ferrier |
| 2005/0221842 A1 | 10/2005 | Kaneko et al. |
| 2005/0286079 A1 | 12/2005 | Takagi |
| 2005/0288955 A1 | 12/2005 | Lewis-Hachmeister |
| 2006/0151598 A1 | 7/2006 | Chen et al. |
| 2006/0217113 A1 | 9/2006 | Rao et al. |
| 2007/0005426 A1 | 1/2007 | Walker et al. |
| 2007/0092114 A1 | 4/2007 | Ritter et al. |
| 2007/0127470 A1 | 6/2007 | Gaedeken et al. |
| 2007/0136418 A1 | 6/2007 | Wolfe |
| 2007/0255620 A1 | 11/2007 | Tumminaro et al. |
| 2007/0260532 A1 | 11/2007 | Blake, III |
| 2007/0299677 A1 | 12/2007 | Maertz |
| 2008/0009268 A1 | 1/2008 | Ramer et al. |
| 2008/0021767 A1 | 1/2008 | Benson et al. |
| 2008/0040417 A1 | 2/2008 | Juncker |
| 2008/0091535 A1 | 4/2008 | Heiser, II et al. |
| 2008/0133336 A1 | 6/2008 | Altman et al. |
| 2008/0162224 A1 | 7/2008 | Coon et al. |
| 2008/0162316 A1 | 7/2008 | Rampell et al. |
| 2008/0192677 A1 | 8/2008 | Abusch-Magder et al. |
| 2008/0221986 A1 | 9/2008 | Soicher et al. |
| 2008/0228600 A1 | 9/2008 | Treyz et al. |
| 2008/0235130 A1 | 9/2008 | Malov et al. |
| 2008/0249936 A1 | 10/2008 | Miller et al. |
| 2008/0249941 A1 | 10/2008 | Cooper |
| 2008/0277465 A1 | 11/2008 | Pletz et al. |
| 2008/0301779 A1 | 12/2008 | Garg et al. |
| 2009/0006175 A1 | 1/2009 | Maertz |
| 2009/0043629 A1 | 2/2009 | Price |
| 2009/0094125 A1 | 4/2009 | Killian et al. |
| 2009/0132366 A1 | 5/2009 | Lam et al. |
| 2009/0132415 A1 | 5/2009 | Davis et al. |
| 2009/0150238 A1 | 6/2009 | Marsh et al. |
| 2009/0170483 A1 | 7/2009 | Barnett et al. |
| 2009/0172728 A1 | 7/2009 | Shkedi et al. |
| 2009/0187436 A1 | 7/2009 | Shoen et al. |
| 2009/0187543 A1 | 7/2009 | Samborn |
| 2009/0271265 A1 | 10/2009 | Lay et al. |
| 2009/0292599 A1 | 11/2009 | Rampell et al. |
| 2009/0292647 A1 | 11/2009 | Porat et al. |
| 2009/0299865 A1 | 12/2009 | Budgen |
| 2009/0313106 A1 | 12/2009 | Taylor et al. |
| 2009/0319638 A1 | 12/2009 | Faith et al. |

(56) References Cited

U.S. PATENT DOCUMENTS

| | | |
|---|---|---|
| 2010/0106568 A1 | 4/2010 | Grimes |
| 2010/0131395 A1 | 5/2010 | Allin et al. |
| 2010/0189227 A1 | 7/2010 | Mannar et al. |
| 2010/0250538 A1* | 9/2010 | Richards ............... G06Q 10/06 707/737 |
| 2010/0274731 A1 | 10/2010 | Tsitsis |
| 2010/0306763 A1 | 12/2010 | Lambert et al. |
| 2010/0332251 A1 | 12/2010 | Yanak et al. |
| 2011/0040785 A1 | 2/2011 | Steenberg et al. |
| 2011/0087547 A1 | 4/2011 | Amaro et al. |
| 2011/0182280 A1 | 7/2011 | Charbit |
| 2011/0191149 A1 | 8/2011 | Blackhurst et al. |
| 2011/0191150 A1 | 8/2011 | Blackhurst et al. |
| 2011/0191160 A1 | 8/2011 | Blackhurst et al. |
| 2011/0191173 A1 | 8/2011 | Blackhurst et al. |
| 2011/0191177 A1 | 8/2011 | Blackhurst et al. |
| 2011/0191180 A1 | 8/2011 | Blackhurst et al. |
| 2011/0191181 A1 | 8/2011 | Blackhurst et al. |
| 2011/0191184 A1 | 8/2011 | Blackhurst et al. |
| 2011/0191238 A1 | 8/2011 | Blackhurst et al. |
| 2011/0238499 A1 | 9/2011 | Blackhurst et al. |
| 2011/0238550 A1 | 9/2011 | Reich et al. |
| 2011/0270773 A1 | 11/2011 | Siekman et al. |
| 2011/0302201 A1 | 12/2011 | Ogaz et al. |
| 2012/0016803 A1* | 1/2012 | Tharp .................... G06Q 10/10 705/319 |
| 2012/0028635 A1 | 2/2012 | Borg et al. |
| 2012/0030092 A1 | 2/2012 | Marshall et al. |
| 2012/0190386 A1 | 7/2012 | Anderson |
| 2012/0290230 A1 | 11/2012 | Berges Gonzalez et al. |
| 2013/0006813 A1 | 1/2013 | Carlin et al. |
| 2013/0046626 A1 | 2/2013 | Grigg et al. |
| 2013/0079931 A1 | 3/2013 | Wanchoo et al. |
| 2013/0096857 A1 | 4/2013 | Chakradhar |
| 2013/0110621 A1 | 5/2013 | Gupta et al. |
| 2013/0132854 A1 | 5/2013 | Raleigh et al. |
| 2013/0185558 A1 | 7/2013 | Seibert et al. |
| 2013/0298242 A1 | 11/2013 | Kumar et al. |
| 2013/0307702 A1 | 11/2013 | Pal et al. |
| 2014/0006529 A1 | 1/2014 | Andreoli-Fang et al. |
| 2014/0047322 A1 | 2/2014 | Kim et al. |
| 2014/0068721 A1 | 3/2014 | Ong et al. |
| 2014/0115324 A1 | 4/2014 | Buer |
| 2014/0226010 A1 | 8/2014 | Molin et al. |
| 2014/0244834 A1 | 8/2014 | Guedalia et al. |
| 2014/0278629 A1 | 9/2014 | Stephenson et al. |
| 2014/0344128 A1 | 11/2014 | Nikankin et al. |
| 2015/0002271 A1 | 1/2015 | Lee et al. |
| 2015/0013001 A1 | 1/2015 | Lee et al. |
| 2015/0081860 A1 | 3/2015 | Kuehnel et al. |
| 2015/0094026 A1 | 4/2015 | Martin |
| 2015/0094093 A1 | 4/2015 | Pierce et al. |
| 2015/0095478 A1 | 4/2015 | Zuerner |
| 2015/0227406 A1 | 8/2015 | Jan et al. |
| 2015/0293574 A1 | 10/2015 | Ehsan |
| 2015/0294553 A1 | 10/2015 | Logan et al. |
| 2015/0312348 A1 | 10/2015 | Lustgarten |
| 2015/0327071 A1 | 11/2015 | Sharma et al. |
| 2015/0358317 A1 | 12/2015 | Deutschmann et al. |
| 2016/0065628 A1 | 3/2016 | Guo et al. |
| 2016/0071334 A1 | 3/2016 | Johnson et al. |
| 2016/0087933 A1 | 3/2016 | Johnson et al. |
| 2016/0132832 A1 | 5/2016 | Pinkovezky et al. |
| 2016/0164919 A1 | 6/2016 | Satish et al. |
| 2016/0210450 A1 | 7/2016 | Su |
| 2016/0217282 A1 | 7/2016 | Vecera et al. |
| 2016/0232336 A1 | 8/2016 | Pitschel et al. |
| 2016/0269411 A1 | 9/2016 | Malachi |
| 2016/0295410 A1 | 10/2016 | Gupta et al. |
| 2016/0300201 A1* | 10/2016 | Li ........................ G06Q 30/06 |
| 2016/0328282 A1 | 11/2016 | Rogati et al. |
| 2016/0337869 A1 | 11/2016 | Dai |
| 2016/0342982 A1* | 11/2016 | Thomas ............... G06Q 20/027 |
| 2016/0367415 A1 | 12/2016 | Hayes et al. |
| 2017/0004508 A1 | 1/2017 | Mansfield et al. |
| 2017/0006135 A1 | 1/2017 | Siebel et al. |
| 2017/0017354 A1 | 1/2017 | Wei |
| 2017/0041296 A1 | 2/2017 | Ford et al. |
| 2017/0061442 A1 | 3/2017 | Barlow et al. |
| 2017/0076408 A1 | 3/2017 | D'Souza et al. |
| 2017/0124642 A1 | 5/2017 | Barnett et al. |
| 2017/0171513 A1 | 6/2017 | Nakamura |
| 2017/0178186 A1 | 6/2017 | Craft |
| 2017/0208079 A1 | 7/2017 | Cammarota et al. |
| 2017/0208139 A1 | 7/2017 | Li et al. |
| 2017/0228773 A1 | 8/2017 | Takayama |
| 2017/0235454 A1* | 8/2017 | Selfridge ............... G06F 3/0484 715/744 |
| 2017/0244618 A1* | 8/2017 | DeLuca .................. H04L 67/22 |
| 2017/0278133 A1* | 9/2017 | Corrado ............ G06Q 30/0255 |
| 2017/0302669 A1 | 10/2017 | Chen et al. |
| 2017/0323345 A1 | 11/2017 | Flowers et al. |
| 2017/0352071 A1 | 12/2017 | Carey et al. |
| 2017/0353859 A1 | 12/2017 | Idnani et al. |
| 2017/0366422 A1 | 12/2017 | Castinado et al. |
| 2018/0007131 A1 | 1/2018 | Cohn et al. |

OTHER PUBLICATIONS

Guagliardo, Joseph C. et al., "Blockchain: Preparing for Disruption Like Its the 90s"; Mar. 14, 2016, retrieved fr; Mar. 14, 2016, retrieved from http://www.law360.com/articles/77120CVprint?section=ip.

Guagliardo, Joseph C. et al., "Blockchain: Preparing for Disruption Like Its the 90s"; Mar. 14, 2016, retrieved from http://www.law360.com/articles/77120CVprint?section=ip.

International Preliminary Report on Patentability (IPRP) dated Jul. 31, 2012 for International Application No. PCT/US2011/022765.

International Search Report and the Written Opinion of the International Searching Authority dated Mar. 25, 2011 for International Application No. PCT/US11/22781.

International Search Report and the Written Opinion of the International Searching Authority dated Mar. 25, 2011 for International Application No. PCT/US11/22783.

International Search Report and the Written Opinion of the International Searching Authority dated Mar. 28, 2011 for International Application No. PCT/US11/22771.

International Search Report and the Written Opinion of the International Searching Authority dated Mar. 29, 2011 for International Application No. PCT/US11/22779.

International Search Report and the Written Opinion of the International Searching Authority dated Mar. 29, 2011 for International Application No. PCT/US11/22785.

International Search Report and the Written Opinion of the International Searching Authority dated Apr. 8, 2011 for International Application No. PCT/US11/22765.

* cited by examiner

COMPUTERIZED RESOURCE REALLOCATION SYSTEM FOR TRANSFERRING RESOURCE BLOCKS BASED ON CUSTODIAN EVENT

FIELD OF THE INVENTION

The present invention embraces a resource reallocation system that includes a processor, a memory, and a resource management module stored in the memory. The system is typically configured for: identifying resources of a custodian; allocating the resources into one or more resource blocks; linking a resource transfer protocol to each resource block, each resource transfer protocol being associated with a particular custodian event; monitoring custodian data; determining that a custodian event has occurred based on monitoring the custodian data; and, in response to determining that the custodian event has occurred, automatically initiating one of the resource transfer protocols.

BACKGROUND

Systems for providing communications between and amongst devices are known where interconnected devices, often referred to as smart devices, may include communications modules, processors and applications that allow the devices to communicate with one another, and with other devices and/or systems, over a network. Such systems allow the devices to collect and exchange data and are commonly referred to as the internet-of-things.

SUMMARY

In one aspect, the present invention embraces a computerized system, and an associated method and computer program product, for providing resource reallocation. The system typically includes a processor, a memory, and a network communication device. The system also typically includes a resource management module stored in the memory and executable by the processor. In one embodiment, the resource management module is configured for: identifying resources of a custodian; allocating the resources into a first resource block; linking a first resource transfer protocol to the first resource block, the first resource transfer protocol being associated with a first custodian event; establishing a communication channel with a distributed network via the network communication device; monitoring custodian data from the distributed network via the network communication device; determining that the first custodian event has occurred based on monitoring the custodian data; and, in response to determining that the first custodian event has occurred, automatically initiating the resource transfer protocol.

In a particular embodiment, the resources comprise a smart device; the resource management module is configured for establishing a secure communication channel with the smart device via the network communication device; and initiating the resource transfer protocol comprises transmitting instructions over the secure communication channel to the smart device via the network communication device.

In another particular embodiment, the instructions are configured to cause the smart device to activate or deactivate.

In yet another particular embodiment, the instructions are configured to cause the smart device to change one or more settings.

In yet another particular embodiment, monitoring the custodian data comprises establishing a secure communication channel with a smart device and monitoring data from the smart device over the secure communication channel via the network communication device; and determining that the first custodian event has occurred is based on monitoring the data from the smart device.

In yet another particular embodiment, the resources comprise a smart device; the resource management module is configured for establishing a secure communication channel with the smart device via the network communication device; monitoring the custodian data comprises monitoring data from the smart device over the secure communication channel via the network communication device; determining that the first custodian event has occurred is based on monitoring the data from the smart device; and initiating the resource transfer protocol comprises transmitting instructions over the secure communication channel to the smart device via the network communication device.

In yet another particular embodiment, determining that the first custodian event has occurred is based on monitoring biometric data received from the smart device.

In yet another particular embodiment, initiating the resource transfer protocol comprises initiating a transfer of the resource in the first resource block to a new custodian, the new custodian being defined in the first resource transfer protocol.

In yet another particular embodiment, the resource management module is configured for verifying an identity of the new custodian; and initiating the transfer of the resource in the first resource block to the new custodian is based on verifying the identity of the new custodian.

In yet another particular embodiment, initiating the resource transfer protocol comprises procuring a new resource for the custodian.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
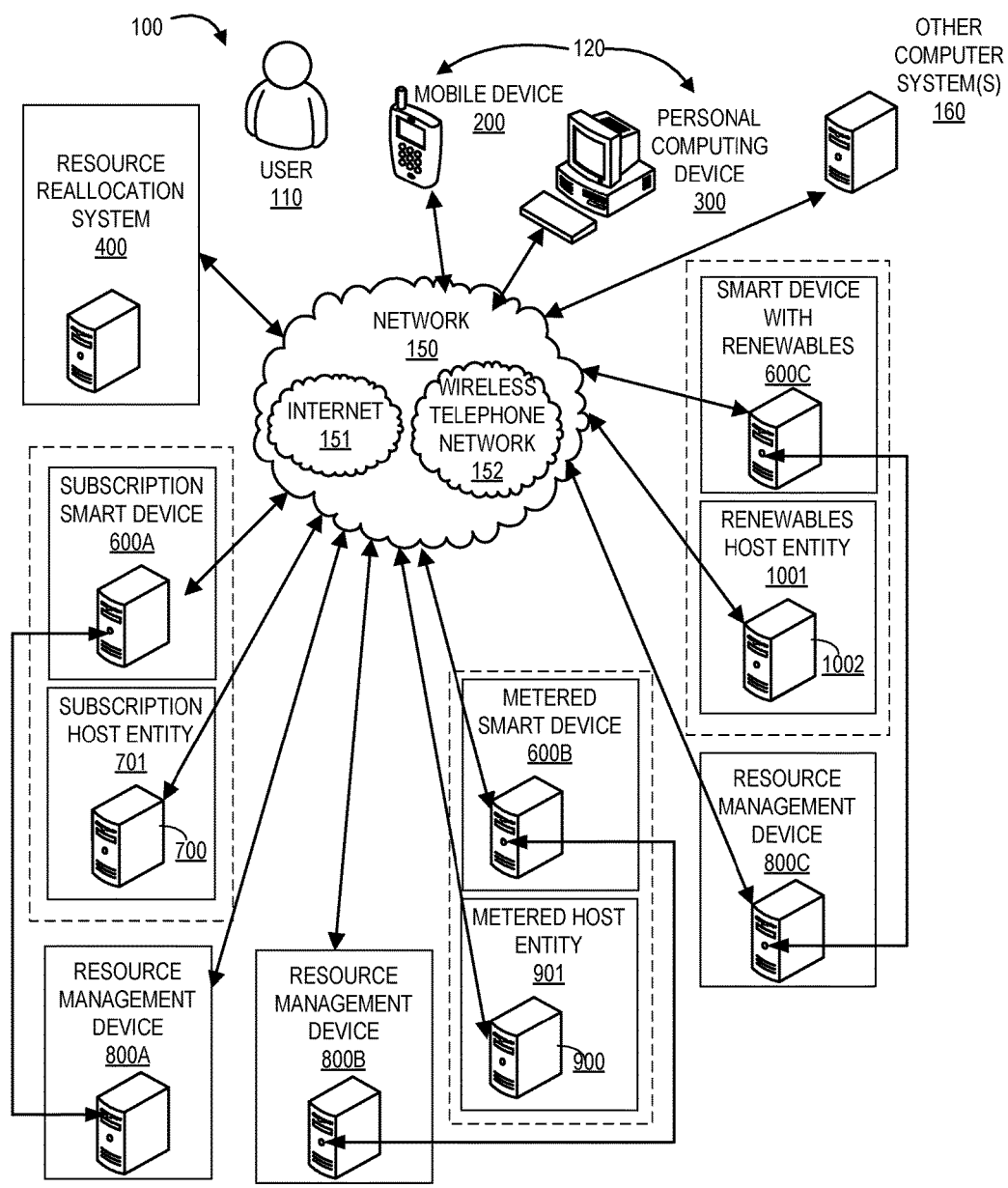
Figure 2:
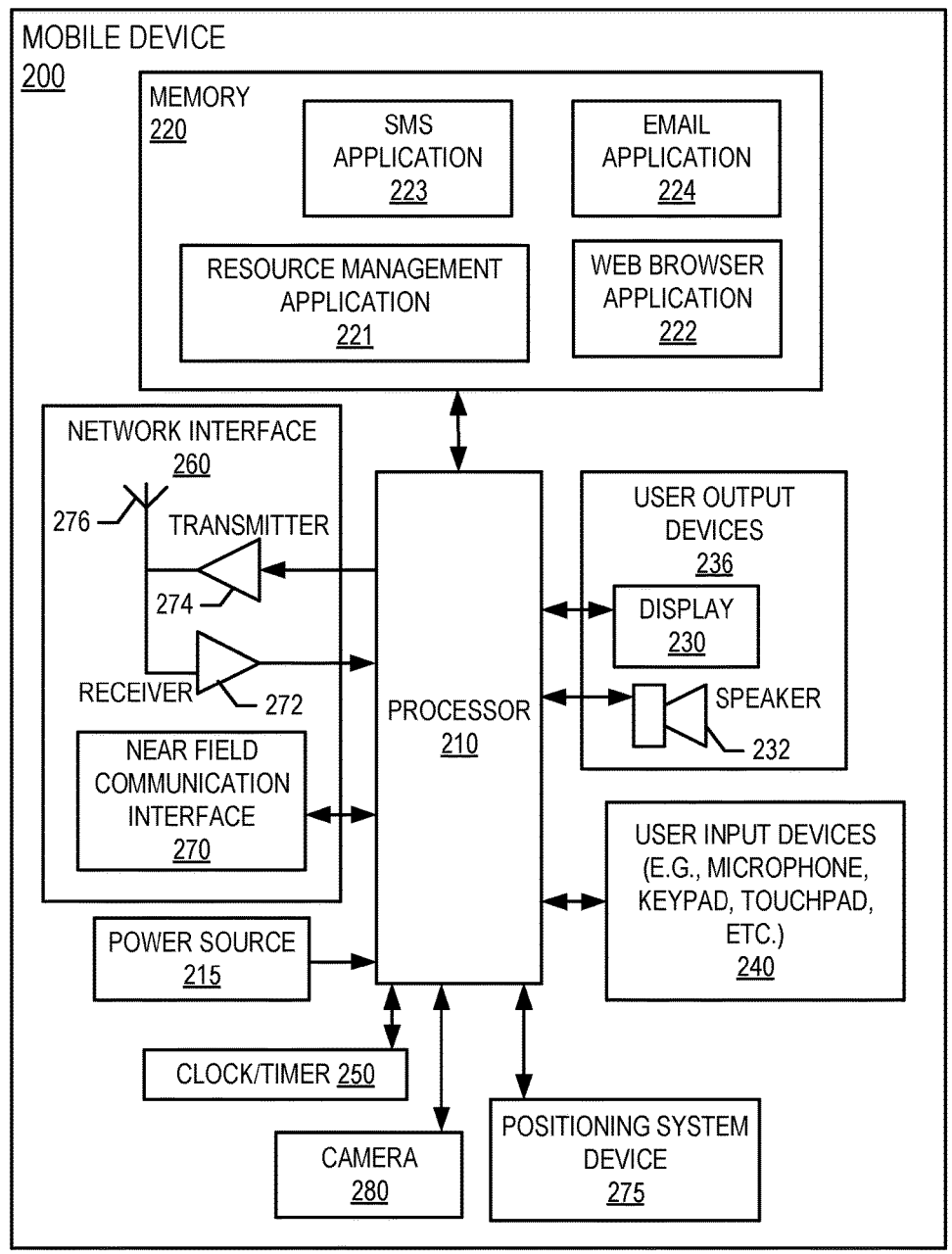
Figure 3:
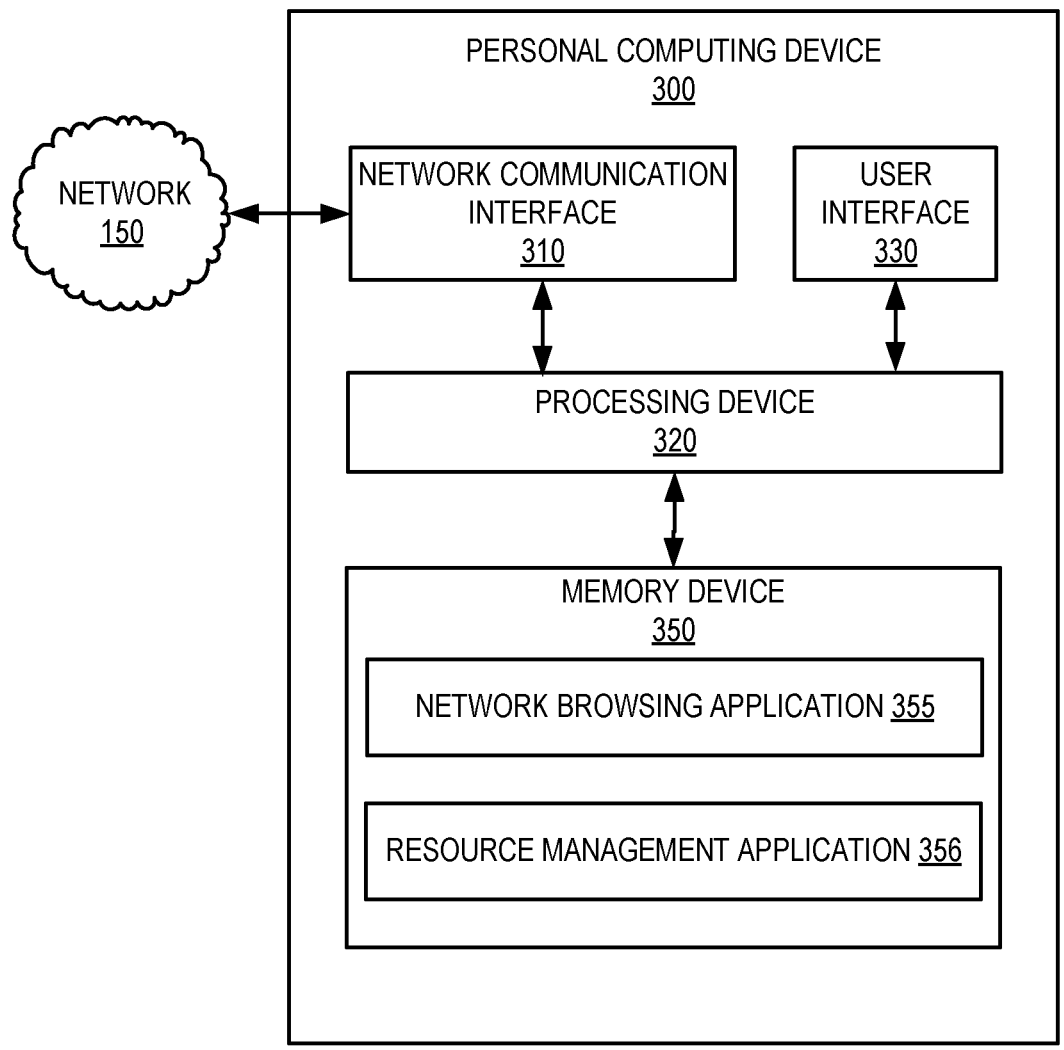
Figure 4:
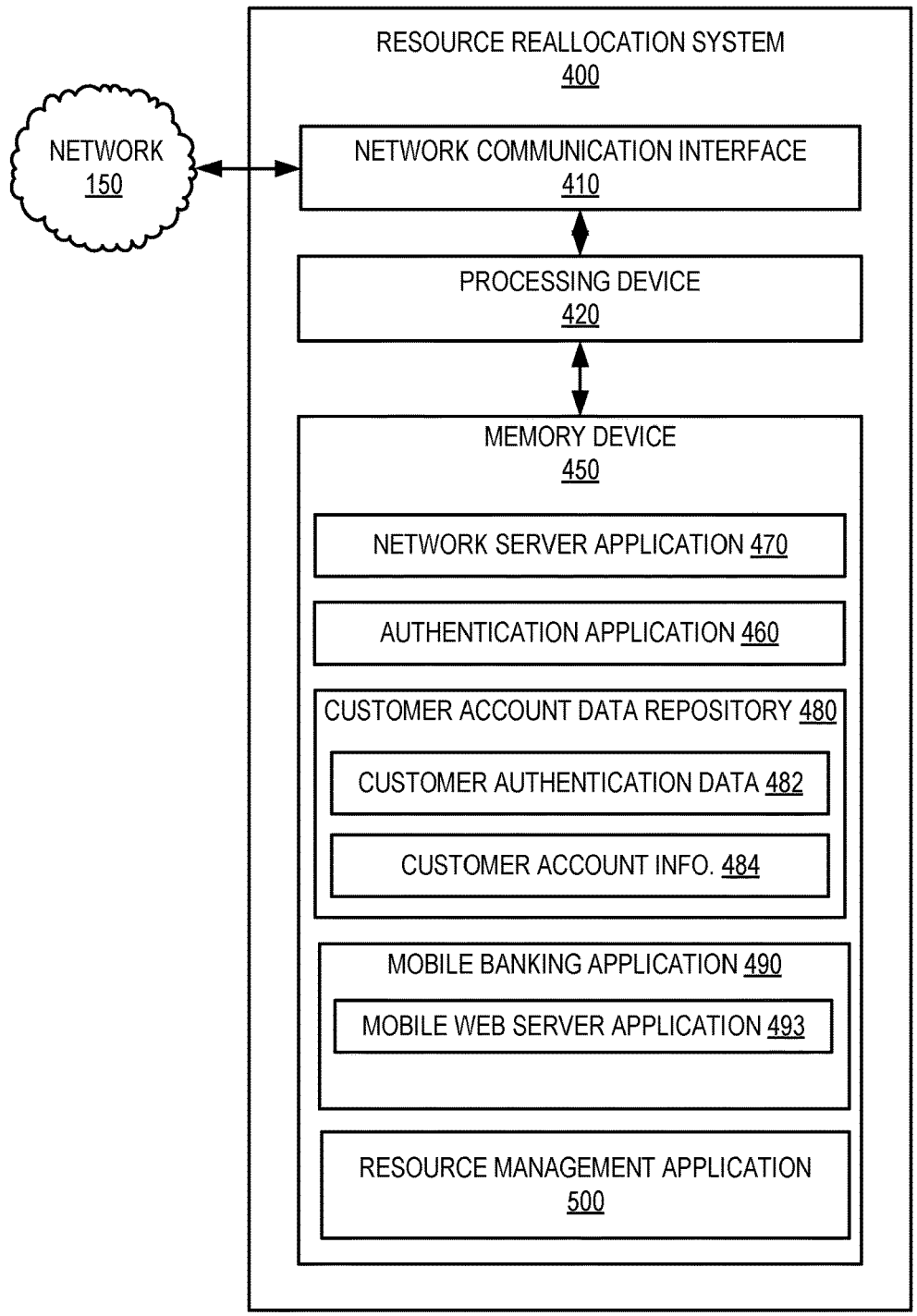
Figure 5:
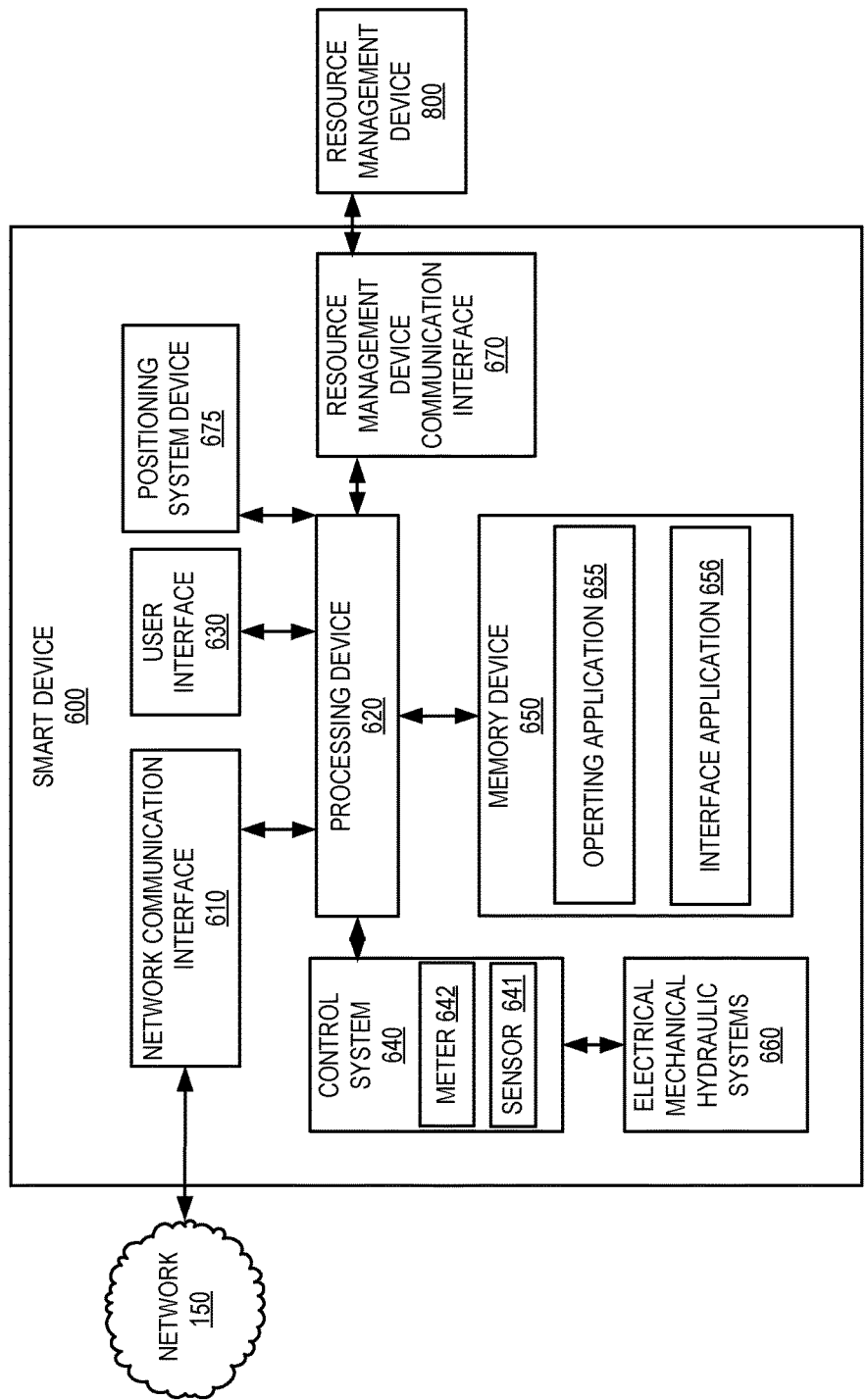
Figure 6:
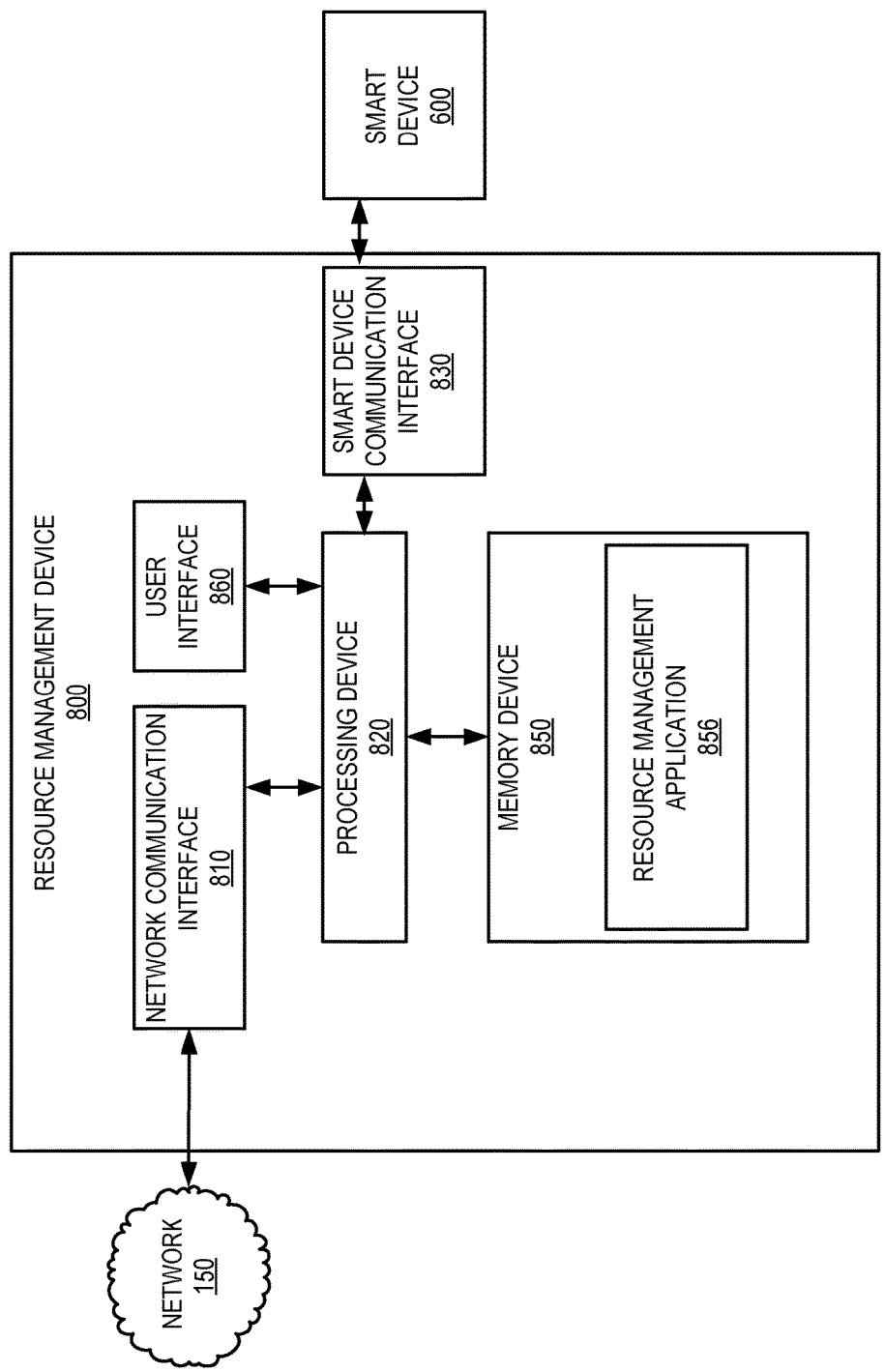
Figure 7:
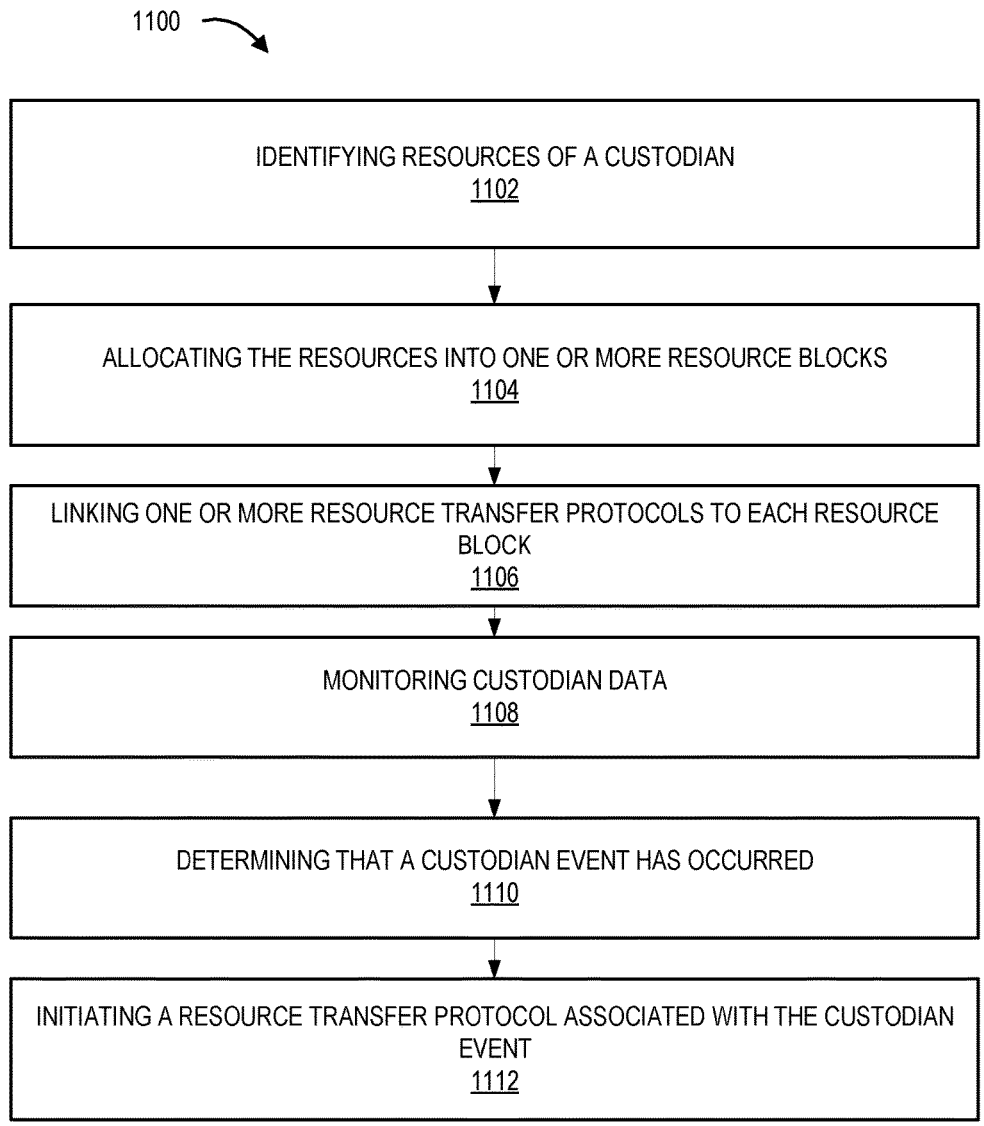

Having thus described embodiments of the invention in general terms, reference will now be made to the accompanying drawings, wherein:

FIG. 1 depicts a resource reallocation system and operating environment in accordance with an exemplary embodiment of the present invention;

FIG. 2 schematically depicts a mobile device in accordance with an exemplary embodiment of the present invention;

FIG. 3 schematically depicts a personal computing device in accordance with an exemplary embodiment of the present invention;

FIG. 4 schematically depicts an resource reallocation system in accordance with an exemplary embodiment of the present invention;

FIG. 5 schematically depicts a smart device in accordance with an exemplary embodiment of the present invention;

FIG. 6 schematically depicts a resource management device in accordance with an exemplary embodiment of the present invention;

FIG. 7 depicts a method of providing resource reallocation based on custodian events in accordance with an exemplary embodiment of the present invention.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Many of the example implementations discussed and contemplated herein involve at least one "smart device". A "smart device" as used herein means a device, apparatus and/or system that is capable of communicating with and transmitting information or data to and/or receiving information or data from other devices, systems or apparatuses including over a network. The smart device may be for example, but not limited to, machines such as automobiles, tractor trailers, airplanes, manufacturing devices, warehouse devices, material handling systems, conveyor systems, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device may be any device that includes a communication interface or module, software and/or hardware that allow the device to communicate data and/or information related to the device with other devices and/or systems over a network.

In accordance with embodiments of the invention, the term "custodian" refers to and includes any individual, organization, entity, or group thereof, that is responsible for a resource. In some embodiments, the custodian is the owner of a resource. In other embodiments, the custodian is responsible for a resource that is owned by another individual or organization. In some example implementations, a user of a smart device may be a custodian of that device. In many example implementations, particularly those that arise in the context of a home environment, a custodian will be the owner of the device. In other example implementations, such as those that arise in the context of a manufacturing facility, information technology (IT) facility, restaurant or food processing facility, and/or other business enterprise settings, a custodian may be an individual or team of individuals responsible for monitoring, maintaining, repairing, and/or replacing smart devices, or otherwise managing the acquisition, deployment, and/or use of smart devices within or across an enterprise.

In accordance with embodiments of the present invention, the term "custodian event" is significant event related to a custodian. In other words, a custodian event typically relates to a significant change in the custodian's circumstances (e.g., life circumstances). For example, a custodian event may be the death of the custodian, the birth of a child of the custodian, adoption of a child, a change in marital or relationship status, a significant health event, a job change, relocating to a different neighborhood, city, or state, or the like.

In accordance with embodiments of the present invention, the term "resource" is any property that a custodian owns or is otherwise responsible for. In some embodiments, a resource is any piece of personal property, such as a smart device. In some embodiments, a resource is an account (e.g., a checking account, a savings account, or an investment account) that is owned or maintained by a custodian.

As used herein, the term "host" or "host entity" means an entity that interacts with the smart device for its primary function or provides goods or services to facilitate the use of a smart device for its primary function. For example, a cable service provider is the host entity for a user's cable box and associated cable service. Likewise, a utility, such as a power company, is the host entity for a user's electric meter and associated electric service. Moreover, for smart machines that require renewable products or accessories, the host entity is the entity that provides the renewables used by the smart device. In some example implementations, the host entity may be a service company associated with the particular smart device or a class of smart devices. For example, a host entity associated with an HVAC system may be a contractor or tradesperson who installed the system and/or a company who provides maintenance and repair services to HVAC systems. Likewise, a host entity associated with a plumbing system may be a plumber. The "host entity" may include a "host system" with a "host entity device" that communicates with other devices described herein.

In some embodiments, an "entity" as used herein may be an organization, such as a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, an insurance account, a money market account, a time deposit, a demand deposit, a pre-paid account, a credit account, a non-monetary user profile that includes only personal information associated with the user, such as an e-mail account, a social media account, a message board account, a gaming website account, or the like. The account is associated with and/or maintained by an entity. In other embodiments, an "entity" may be an organization other than a financial institution, such as a social media site, a message board, or a news outlet.

As used herein, an "online banking account" is an account that is associated with one or more user accounts at a financial institution. For example, the user may have an online banking account that is associated with the user's checking account, savings account, investment account, and/or credit account at a particular financial institution. A username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, or a person who applied for a loan that has not yet been funded). In other embodiments, the "customer" may refer to the user. In some embodiments, the user is a custodian of a resource.

Many of the embodiments and example implementations thereof described herein are directed toward solving a pervasive technical problem that consumers at all levels, from individuals to global enterprises, have suffered without reprieve, namely, that significant events related to a custodian (e.g., the death of the custodian) may result in a need to transfer resources of the custodian to a new custodian. However, such transfers are often costly (e.g., monetarily, and in terms of time, convenience, stress, and other factors impacting individuals and businesses) and time consuming. Moreover, delays in transferring such resources may be particularly costly both in terms of opportunity costs (e.g., the inability of the new custodian to utilize the resource until the transfer has been completed) and degradation of such resources, such as a smart device failing or needing repairs due to the lack of proper maintenance.

To solve this technical issue and related technical issues, the present invention embraces a resource reallocation system that automates the transfer of resources following a custodian event. In particular, resources of a custodian may be identified and allocated to one or more resource blocks. A resource transfer protocol is typically linked with a resource block. Each resource transfer protocol typically defines the event(s) that occur to the resources allocated to a particular resource block following a custodian event. For example, a resource transfer frame may define a new custodian to whom resources within a particular resource block are assigned following the death of the custodian. The system will then typically monitor custodian data to determine whether a custodian event has occurred. Once the system determines that a custodian event has occurred, the system automatically will initiate any resource transfer protocol(s) corresponding to the custodian event. Accordingly, resources can be more easily transferred and costs associated with transfer delays can be avoided.

FIG. 1 provides a block diagram illustrating an environment 100 for a system for intelligent resource procurement, in accordance with an embodiment of the invention. In some embodiments, the user resource includes financial assets that are securely distributed in a payment system associated with the user and/or one or more smart devices. As illustrated in FIG. 1, the environment 100 includes a user 110 where the user represents a customer having a relationship with at least one but typically more than one financial institution. A user of the system may be a person, but may also be a business or any other entity, including but not limited to a custodian of a smart device. In a typical environment, thousands of users may access the resource reallocation system described herein.

The environment 100 also may include a plurality of user devices. The user devices may include any machine, apparatus, system or the like that may be connected to and communicate with other devices over a network 150. At least one of the devices may include a computing device 120 for use by the user 110. The computing device 120 may be any device that employs a processor and memory and can perform computing functions, such as a personal computing device 300 or a mobile device 200, that may be connected to or access the network 150. The personal computing device 300 may include a personal computer such as a desktop computer, laptop computer, tablet or any type of personal computing device that may be connected to a network by landline or wireless access such as wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. As used herein, the mobile device 200 may include any mobile communication device, such as a cellular telecommunications device (i.e., a cell phone or mobile phone), personal digital assistant (PDA), a mobile Internet accessing device, tablet computer, or other mobile device. A mobile device may connect to the network by a cellular telecommunications network or by WiFi, Bluetooth or other access technology. In some embodiments where, for example, the user is an institution the computing device 120 may include servers, access terminals, or the like.

The computing device 120 may be configured to communicate over network 150 with at least one resource reallocation system 400 of an entity, such as a financial institution, and with one or more smart devices and/or resource management devices as will hereinafter be described. Other computer systems 160, such as a social networking system, a financial system, or a merchant system, may also be in communication with the computing device 120, resource reallocation system 400, smart devices, resource management devices, and host entities. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet 151. In one embodiment, the network 150 may also include a wireless telephone network 152.

In general, the computing device 120 is configured to connect with the network 150 and may be used to log the user 110 into the resource reallocation system 400 of the entity. A user 110 in order to access the user's account(s) typically uses an online banking application and/or mobile banking application on the resource reallocation system 400 and must authenticate with the resource reallocation system 400. For example, logging into the resource reallocation system 400 generally requires that the user 110 authenticate his/her/its identity using a user name, a passcode, a cookie, a biometric identifier, a private key, a token, and/or another authentication mechanism that is provided by or for the user 110 to the resource reallocation system 400 via the computing device 120. In some embodiments the authentication system may be a tiered system that may require different levels of authentication based on conditions such as, for example, previous activity of the user over the network 150. For example, the tiered authentication system may have three levels of authentication—hard, medium and soft. Hard authentication may require that the user input a high level of authentication information such as a combination of password, user identification, answer to challenge questions, biometrics, random key number or the like. A hard authentication might be required when the user logs on from an unrecognized user device or where the user activity is not recognized by the system. A medium authentication level may require only a user identification and password. A medium level of authentication might be required where, for example, the user has already logged-in to the computing device 120 using an authentication procedure for the device such as a thumbprint or password. A soft authentication may require only a user identification such as user name. A soft level of authentication may be used, for example, where the user has already logged-in to the computing device 120 using an authentication procedure for the device such as a thumbprint or password and the user has performed activities on the user device that are recognized as "normal" activity for that user and/or the user device is in a recognized location for that user. Thus, the level of authentication required for accessing the banking application, whether online, mobile or in person, may be adjusted based on conditions, activity, functions or information received about or from the user.

FIG. 2 provides a block diagram illustrating a user's mobile device 200 of FIG. 1 in more detail, in accordance with embodiments of the invention. In one embodiment of the invention, the mobile device 200 is a mobile telephone. However, it should be understood that a mobile telephone and the embodiment of the mobile device 200 shown in FIG. 2 are merely illustrative of one type of mobile device 200 that may benefit from, employ, or otherwise be involved with embodiments of the present invention and, therefore, should not be taken to limit the scope of embodiments of the present invention. Other types of mobile devices 200 may include portable digital assistants (PDAs), pagers, tablets, mobile televisions, gaming devices, laptop computers, cameras, video recorders, audio/video player, radio, GPS devices, or any combination of the aforementioned.

Some embodiments of the mobile device 200 include a processor 210 communicably coupled to such devices as a memory 220, user output devices 236, user input devices 240, and a network interface 260. The mobile device 200 further includes a power source 215, such as a battery, for powering various circuits and other devices that are used to operate the mobile device 200. Embodiments of the mobile device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the mobile device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 222. The web browser application 222 may then allow the mobile device 200 to transmit and receive web content, such as, for example, location-based content and/or other web page content, according to a Wireless Application Protocol (WAP), Hypertext Transfer Protocol (HTTP), and/or the like. The memory device 220 may include other applications such as e-mail application 224 and SMS application 223.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the mobile device 200 may be configured to operate with one or more air interface standards, communication protocols, modulation types, and access types. By way of illustration, the mobile device 200 may be configured to operate in accordance with any of a number of first, second, third, and/or fourth-generation communication protocols and/or the like. For example, the mobile device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The mobile device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the mobile device 200. In some embodiments, the NFC interface 270 is not supported in and/or on the mobile device 200, but the NFC interface 270 is otherwise operatively connected to the mobile device 200 (e.g., where the NFC interface 270 is a peripheral device plugged into the mobile device 200). Other apparatuses having NFC interfaces mentioned herein may be configured similarly. In some embodiments, the NFC interface 270 of the mobile device 200 is configured to contactlessly and/or wirelessly communicate information to and/or from a corresponding NFC interface of another apparatus (e.g., an automated teller machine (ATM) or another mobile or computing device).

As described above, the mobile device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the mobile device 200 to transmit data, may include any of a number of devices allowing the mobile device 200 to transmit data, such as a keypad, keyboard, touch-screen, touchpad, microphone, mouse, joystick, other pointer device, button, soft key, and/or other input device(s). The user interface may also include a camera 280, such as a digital camera.

The mobile device 200 may also include a positioning system device 275 that is configured to be used by a positioning system to determine a location of the mobile device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the mobile device 200. In other embodiments, the positioning system device 275 includes a proximity sensor or transmitter, such as an RFID tag, that can sense or be sensed by devices known to be located proximate a location to determine that the mobile device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which include computer-executable instructions/code executed by the processor 210 to implement the functions of the mobile device 200 and/or one or more of the process/method steps described herein. The memory 220 includes a resource management application 221 that may be used to allow communication with an entity system such as the resource reallocation system 400 and/or the smart devices to implement the system of the invention. The use of the resource management application 221 may facilitate access to the system of the invention by providing log-in systems including user authentication systems, account information, system controls or the like. The resource management application 221 also communicates with the smart devices and the resource reallocation system 400 to allow the user to set up and/or control the system of the invention. In some embodiments, the resource management application 221 is an online banking application that provides, among other things, resource management and reallocation functionality as described herein.

These applications also typically provide a graphical user interface (GUI) on the display 230 that allows the user 110 to communicate with the mobile device 200, the resource reallocation system 400 and/or other devices or systems. The memory 220 can also store any of a number of pieces of information, and data, used by the mobile device 200 and the applications and devices that make up the mobile device 200 or are in communication with the mobile device 200 to implement the functions of the mobile device 200 and/or the other systems described herein. For example, the memory 220 may include such data as user authentication information.

Referring now to FIG. 3, the personal computing device 300 also includes various features, such as a network communication interface 310, a processing device 320, a user interface 330, and a memory device 350. The network communication interface 310 includes a device that allows the personal computing device 300 to communicate over the network 150 (shown in FIG. 1). In one embodiment of the invention, a network browsing application 355 provides for a user to establish network communication with a resource reallocation system 400.

As used herein, a "processor" or "processing device," such as the processing device 320, generally refers to a device or combination of devices having circuitry used for implementing the communication and/or logic functions of a particular system. For example, a processing device 320 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 320 may further include functionality to operate one or more software programs based on computer-executable program code thereof, which may be stored in memory device 350. As the phrase is used herein, a processor or processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" generally includes a plurality of interface devices and/or software that allow a customer to input commands and data to direct the processing device to execute instructions. For example, the user interface 330 presented in FIG. 3 may include a graphical user interface (GUI) or an interface to input computer-executable instructions that direct the processing device 320 to carry out specific functions. The user interface 330 employs certain input and output devices as previously described with reference to FIGS. 1 and 2. These input and output devices may include a display, mouse, keyboard, button, touchpad, touch screen, microphone, speaker, LED, light, joystick, switch, buzzer, bell, and/or other user input/output device for communicating with one or more users.

As used herein, a "memory" or "memory device" generally refers to a device or combination of devices that store one or more forms of computer-readable media for storing data and/or computer-executable program code/instructions. Computer-readable media is defined in greater detail below. For example, in one embodiment, the memory device 350 includes any computer memory that provides an actual or virtual space to temporarily or permanently store data and/or commands provided to the processing device 320 when it carries out its functions described herein. The memory device 350 may include such applications as a conventional web browsing application 355 and/or a resource management application 356. The resource management application 356 may be used to allow communication with an entity system, such as the resource reallocation system 400, to provide access to the entity log-in systems including user authentication systems, account information or the like as previously described with respect to FIG. 2.

FIG. 4 provides a block diagram illustrating the resource reallocation system 400, in greater detail, in accordance with embodiments of the invention. As illustrated in FIG. 4, in one embodiment of the invention, the resource reallocation system 400 includes one or more processing devices 420 operatively coupled to a network communication interface 410 and a memory device 450. In certain embodiments, the resource reallocation system 400 is operated by an entity, such as a financial institution.

It should be understood that the memory device 450 may include one or more databases or other data structures/repositories. The memory device 450 also includes computer-executable program code that instructs the processing device 420 to operate the network communication interface 410 to perform certain communication functions of the resource reallocation system 400 described herein. For example, in one embodiment of the resource reallocation system 400, the memory device 450 includes, but is not limited to, a network server application 470, an authentication application 460, a customer account data repository 480 which includes customer authentication data 480 and customer account information 484, a mobile banking application 490 including a mobile web server application 493, and other computer-executable instructions or other data. The computer-executable program code of the network server application 470, the authentication application 460, or the mobile banking application 490 may instruct the processing device 420 to perform certain logic, data-processing, and data-storing functions of the resource reallocation system 400 described herein, as well as communication functions of the resource reallocation system 400. The mobile banking application 490 communicates with the user computing device 120 to facilitate communication between the user and the entity.

In one embodiment, the customer account data repository 480 includes customer authentication data 482 and customer account information 484. The network server application 470, the authentication application 460, and the mobile banking application 490 are configured to invoke or use the customer account information 484, the customer authentication data 482 when authenticating a user to the resource reallocation system 400. In some embodiments, the customer account information 484 may include information regarding the resources of a custodian, such as how such resources are allocated to different resource blocks and resource transfer protocol(s) specifying what should occur following a particular custodian event.

The resource reallocation system 400 further includes a resource management application 500 that communicates with the smart devices 600, the user's computing device 120, the resource management devices, and/or the host entities. The resource management application 500 functions to manage a user's resources (e.g., as informed by the resource management application 856 of a resource management device 800). In some embodiments, the resource management application 500 is an application that reallocates resources, such as smart devices, following a custodian event.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the mobile device 200, the personal computing device 300, and the resource management device 800 and/or the smart device 600. The processing device 420 is configured to use the network communication interface 410 to transmit and/or receive data and/or commands to and/or from the other devices connected to the network 150.

FIG. 5 provides a block diagram illustrating smart device 600, in accordance with embodiments of the invention. A "smart device" as used herein means a device, apparatus and/or system that is capable of communicating with and transmitting information or data to and/or receiving information or data from other devices, systems or apparatuses including over network 150. FIG. 5 illustrates an exemplary embodiment of a smart device. The smart device 600 may be for example, but not limited to, a machine such as an automobile, tractor trailer, airplane, manufacturing device, warehouse devices, material handling system, conveyor system, robotics or the like; appliances such as refrigerators, washer/dryers, dish washers, or the like; home entertainment devices or systems such as set top boxes, gaming systems, internet televisions, or the like; home or building systems such as home security systems, utility systems such as electrical, water, plumbing systems and apparatuses such as electric meters, water meters, hot water heaters, gas meters or the like; and personal devices such as wearable devices such as internet capable fitness devices, watches, glasses or the like. The list of smart devices provided herein is not exhaustive such that the smart device 600 may be any device that includes a communication interface or module, software and/or hardware that allow the device to communicate data and/or information related to the device with other devices and/or systems over network 150.

As illustrated in FIG. 5, one exemplary embodiment of a smart device 600 may generally include, but is not limited to, a network communication interface 610, a processing device 620, and a memory device 650 such as described herein. The processing device 620 is operatively coupled to the network communication interface 610 and the memory device 650. The smart device may also have a control system 640 for controlling the physical operation of the device. The control system may include one or more sensors 641 for detecting operating conditions of the various mechanical and electrical systems 660 of the smart device or of the environment in which the smart device is used. The sensors 641 may communicate with the processing device 620 to provide feedback to the operating systems of the device. The control system 640 may also include metering devices 642 for measuring performance characteristics of the smart device. The control system 640 may also include controllers such as programmable logic controllers (PLC), proportional integral derivative controllers (PID) or other machine controllers. The smart device may also include various electrical, mechanical, hydraulic or other systems 660 that perform various functions of the smart device. These systems may include, for example, electrical circuits, motors, compressors, or any system that enables functioning of the smart device.

In one embodiment, applications having computer-executable program code that instruct the processing device 620 to operate the various systems of the smart device including network communication interface 610 to perform certain communication functions and to perform certain logic, data processing, and data storing functions of the application as described herein are stored in memory device 650. The applications may include a smart device operating application 655 that controls the various systems 640, 660 and functions of the smart device to control operation of the smart device during use.

The network communication interface 610 is a communication interface having one or more communication devices configured to communicate with one or more other devices on the network 150. The processing device 620 is configured to use the network communication interface 610 to receive information from and/or provide information and commands to other devices and systems via the network 150. The network communication interface 610 may be over a wireless connection or a wired connection such as described above. The smart device may also include a user interface 630. The user interface allows inbound and/or outbound communication with the smart device and may take a wide variety of forms depending on the type of smart device. The user interface may include interface devices as previously described with respect to FIGS. 3 and 4 and/or may include other user interface devices such as appliance input devices such as push buttons, entertainment input devices such as remote controls, vehicle input devices such as found on an automobiles infotainment systems or the like. In some embodiments the input device may be controlled by the host entity such that the smart device is secure. For example, with a utility meter the user interface 630 may be controlled by the utility. In some embodiments, such as utility meters the input device may be a specialized plug-in device or it may be remote from the smart device and may access the smart device over a public or private network.

The smart device may also include a resource management device communication interface 670 that allows the smart device 600 to be connected to and to communicate with a resource management device 800. The resource management device communication interface may include a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the smart device may also include a communication interface that may be connected by a hardwire connection to the resource management device. The communication interface may include a connector such as a USB, SATA, PATA, SAS or other data connector for transmitting data to and from the smart device. In some embodiments the smart device may include a port or plug that is compatible with a mating port or plug on the resource management device. In some embodiments the network communication interface 610 may function as both the network interface device and the resource management device communication interface 670.

The smart device 600 may also include a positioning system device 675 that is configured to be used by a positioning system to determine a location of the smart device 600. For example, the positioning system device 675 may include a GPS transceiver. In some embodiments, the positioning system device 675 is at least partially made up of components of the network communication interface. For example, in one embodiment, triangulation of cellular signals may be used to identify the approximate location of the smart device 600. In other embodiments, the positioning system device 675 includes a proximity sensor or transmitter, such as an RFID tag, that can sense or be sensed by devices known to be located proximate a location to determine that the smart device 600 is located proximate these known devices.

As illustrated in FIG. 6, one exemplary resource management device 800 may generally include, but is not limited to, a network communication interface 810, a smart device communication interface 830, a processing device 820, and a memory device 850 such as described herein. The processing device 820 is operatively coupled to the network communication interface 810, the smart device communication interface 830 and the memory device 850. In one embodiment, applications having computer-executable program code that instructs the processing device 820 to operate the various functions of the resource management device to perform certain communication functions and to perform certain logic, data processing, and data storing functions of the application as described herein are stored in memory device 850. The applications may include a resource management application 856 that communicates with the smart device 600 and the resource reallocation system 400 as will be described.

The network communication interface 810 is a communication interface having one or more communication devices configured to communicate with one or more other devices on the network 150. The processing device 820 is configured to use the network communication interface 810 to receive information from and/or provide information and commands to other devices and systems via the network 150. The network communication interface 810 may be over a wireless connection or a wired connection such as described above. The resource management device 800 may also include a smart device communication interface 830 that allows the resource management device 800 to be connected to and to communicate with a smart device 600. The smart device communication interface 830 may include a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface the resource management device 800 may also include a communication interface device that may be connected by a hardwire connection to the smart device. The communication interface device may include a connector such as a USB, SATA, PATA, SAS or other data connector for transmitting data to and from the smart device 600. In some embodiments the smart device communication interface 830 may include a port or plug that is compatible with a mating port or plug on the smart device. In some embodiments the network communication interface 810 may function as both the network interface device and the smart device communication interface 830. The smart device communication interface 830 of the resource management device 800 is operatively coupled to the resource management device communication interface 670 of the smart device 600 to allow the smart device 600 to communicate with the resource management device 800. The interfaces 670 and 830 allow host information to be communicated between the smart device and the resource management device where host information may include any information used by the resource management device 800 to transmit the data and/or and initiate a secure management of resources in connection with the resource reallocation system.

The resource management device 800 may also include a user interface 860. The user interface 860 allows inbound and/or outbound communication with the resource management device and may take a wide variety of forms depending on the type of resource management device 800. The user interface may include interface devices as previously described with respect to FIGS. 3, 4, and/or 5 may include other user interface devices. In some embodiments the input device may be controlled by the entity such that the resource management device 800 is secure. In some embodiments, such as with utility meters the input device may be a specialized plug-in device or it may be remote from the resource management device 800 and may access the resource management device 800 over a public or private network.

In one embodiment, the resource management application 856, processing device 820 and the memory device 850 are operable to communicate with and/or effect a transaction with a resource reallocation system 400. The smart device may be programmed with an interface application 656 during manufacture of the smart device 600 to interact and complete a data exchange with the resource management device 800. The resource management application 856 of resource management device 800 may communicate with a third party entity system, such as resource reallocation system 400, that is not related to the host entity of the smart device 600. In other words the resource management device 800 may be programmed with the resource management application 856 to communicate with a third party system (e.g. the resource reallocation system 400) where the third party system is operated and managed by an entity that is independent of the host system.

The term "host entity" as used herein means the entity that operates the smart device for its primary function or that interacts with the smart device for its primary function. For example, a cable service provider is a host entity for a user's cable box and associated cable service. Likewise, a utility, such as a power company, is a host entity for a user's electric meter and associated electric service. Moreover, for smart machines that require renewable products or accessories a host entity is the entity that provides the renewables used by the smart device. In some example implementations, a host entity may be a service company associated with the particular smart device or a class of smart devices. For example, a host entity associated with an HVAC system may be a contractor or tradesperson who installed the system and/or a company who provides maintenance and repair services to HVAC systems. Likewise, a host entity associated with a plumbing system may be a plumber. The "host entity" may include a "host system" with a "host entity device" that communicates with other devices described herein. As used herein "third party entity" refers to an entity that is not the host entity and that utilizes the resource management application 856 to distribute resources on behalf of a user. The "third party entity" may include a "third party system" with a "third party device" that communicates with other devices described herein. For example, the third party entity may be a financial institution that provides a payment rail to the host entity for services or products associated with the smart device and/or otherwise communicates with the host entity regarding aspects of the smart device. Specific example embodiments of the operation of the system will be provided. In one example embodiment, the third party system is the resource reallocation system 400 of a financial institution and the resource management between the smart device, the host entity and the financial institution is a financial transaction that may include a payment from the user's financial institution to the host entity and/or a communication regarding the maintenance, repair, and/or replacement of the smart device and the payment therefor.

Referring to FIGS. 1, 5 and 6, an embodiment of one process and system will be described. In this embodiment the smart device 600a includes a device that requires a predetermined payment by the user to enable operation of the device and/or provision of a service over that device. Example embodiments of such devices and services are systems that require the user to enter into a contract or subscription with a service provider where the terms of the contract or subscription require agreed upon payments in order for the user to obtain the contracted for service. Such systems are referred to herein as "subscription" systems, services and devices. Common examples of such subscription devices include, but are not limited to, cellular phones, tablets, laptop computers, personal computers, set top boxes, wearable devices, land line phones, receivers such as cable boxes, satellite receivers, internet ready televisions, or the like. Such devices may provide cellular phone service, entertainment services such as cable, satellite, internet that provide television, movie, news, music or other content to a user. Other examples of such devices and services are automobiles with wireless audio connectivity, and security systems with control boxes having wireless or hard wired connectivity. Still other examples of such devices and services are connected gaming systems and consoles. In these and other similar systems the operation of the system, the provision of content and/or services associated with system and the manufacture, sale, lease, installation or other provision of devices is controlled and/or provided by one or more host entities 701. For example, the host entity may include, but is not limited to, cable television provider, a phone service company, a satellite television/radio provider, a gaming company, an ISP, an automobile manufacturer, a security company, a content provider or other entity. In some embodiments the entity that provides the smart device and the entity that provides the associated service may be different entities where one or both of the entities may be a host entity. For example, a television manufacturer may provide an internet ready television but the service may be provided by a separate content provider such as an internet streaming service. In other embodiments the host entity provides both the smart device and the associated service. For example, with the example of cable television the host entity may include the cable system operator that manufactures or contracts for the manufacture of equipment, installs the infrastructure, sells or leases the equipment to the end user and arranges the provision of content to the user. The user may pay for the subscribed service either in regular installments or on a per use basis. For example, the user may pay a regular monthly payment and/or an on-demand per use rental fee. The terms and conditions of the payments may be maintained in the memory device 850 of the resource management device 800a and are accessible to the resource management application 856.

In one embodiment of the invention, the resource management device 800a is programmed with a resource management application 856 that provides for the acquisition and transmission of data regarding the functionality of the smart device 600a such as a usage profile and/or diagnostic code associated with the smart device 600a such that communication of a set of smart device data and instruction information related thereto may be initiated by the resource management device 800a in cooperation with smart device 600a. The resource management device 800a may be in machine to machine communication with the smart device 600a over communication interfaces 670, 830. The resource management device 800a may be in direct machine to machine communication with the resource reallocation system 400 over network 150. The resource management device 800a may function to initiate and/or effectuate a targeted communication with the host entity system 700 of the host entity 701. In one embodiment the resource management application 856 of resource management device 800 transmits a secured request such as a token to the resource reallocation system 400 over network 150 via network communication interface 810 based on information stored in memory device 850 and/or as provided by the smart device 600a to the resource management device 800a. The secured request includes resource management information where resource management information is a set of instruction information (such as a set of smart device data, an identification of a failure condition of the smart device, and a set of contact information associated with the custodian or user of the smart device), that the resource reallocation system 400 uses to initiate a targeted communication with the host entity 701 and/or between the host entity 701 and a custodian (such as user 110 of smart device 600a). In a system that uses a token or other secured request, the resource management information may have no intrinsic value. The secured request is informed by and transmitted in accordance with the terms, conditions, or other rules set by the resource reallocation system 400 and/or the subscription host entity 701. For example, a secured request may be sent requesting periodic service or maintenance of a smart device 600a associated with host entity 701 and user 110. Tokenization security systems are known where a token having no intrinsic value is substituted for sensitive data such that the authorization does not involve the transmission of sensitive data. As a result, security is enhanced and security risks from data breaches are reduced. In the present invention, the token may be substituted for user and/or custodian account information, personal identification information, and/or potentially sensitive information about a damaged smart device, such that the token generated by the resource management device 800 may be attributed to a user and/or custodian account at the financial institution. The smart device 600a and host entity 701 may not have user account information or other potentially sensitive information which is instead securely maintained by the resource reallocation system 400. As a result, the security of the user's financial or otherwise sensitive information can be maintained by a single entity such that security over the user's financial or otherwise sensitive information may be controlled and enhanced. The resource management device 800a generates the secured request based on the smart device information using the resource management application 856 and transmits the secured request and/or instruction information using network communication interface 810 to the resource reallocation system 400 over network 150. The secured request and/or instruction information is received by the resource reallocation system 400 and the resource management information (such as a set of instruction information associated with a failure condition of a smart device) in the request is recognized by resource reallocation system 400. Upon receiving the resource management information, the resource reallocation system 400 transmits information to the host entity system 700 in accordance with the resource management application 500. Where the resource management application 856 is an application configured to relay smart device usage and/or failure condition information and instruction information thereto, the resource reallocation system 400, using resource management application 500, generates a transmission to the host entity 701 that can be used to initiate a targeted communication between the host entity and the custodian of the smart device 600a. For example, the resource reallocation system 400 may transmit a message to the host entity 701 that includes information about the smart device 600a, a failure condition thereof, contact information for the custodian of device 600a and an indication that the host entity 701 should contact the custodian.

The terms and conditions of the resource management and communication associated therewith may be agreed to by the user/custodian and the third party entity and stored in resource management application 500. For example where the resource management application is a maintenance, repair, and/or replacement application, such as an application that monitors the status of a smart device, the terms and conditions of the service and contact related to service may be established. Upon taking control of, installing or otherwise accessing the resource management device 800a, the user or custodian may register the resource management device 800a with the resource reallocation system 400 such that the resource reallocation system 400 recognizes a secured request from that resource management device 800a as belonging to that user. The user/custodian may access the user's and/or custodian's account via an on-line application through a user computing device 120 to register the resource management device 800a with the resource reallocation system 400. In the case of a financial institution the user may register the resource management device 800a through the mobile banking application 490. The user may also register the resource management device 800a with the resource reallocation system 400 other than using an on-line application. In some embodiments the resource management device 800a may register itself with the resource reallocation system 400 based on information provided to the resource management device 800a by the user during start-up of the smart device.

Referring again to FIGS. 1, 5 and 6, the smart device 600b may include a smart device that meters usage of a product or service where payment by the user is based on usage levels. Example embodiments of such devices and services are systems such as utilities including, but not limited to, water utilities, electrical utilities, gas utilities that utilize meters to determine usage. With the system of the invention, the smart device 600b includes a metering device 642 or other sensor 641. The resource management application 856 provides for monitoring of user's usage of the resource management device 800b, and may also monitor other aspects of a usage profile of the resource management device 800b, including but not limited to the recognition of diagnostic codes generated by the resource management device 800b. As depicted in FIG. 1, resource management device 800b is in machine to machine communication with the resource reallocation system 400. In one embodiment, the resource management application 856 includes a maintenance application that transmits a secured request such as a token to the resource reallocation system 400. The secured request is received by the resource reallocation system 400 and is recognized as an instruction to initiate a targeted communication between the host entity system 900 (e.g. the utility or other host entity 901 that operates the smart device 600b) and the custodian of smart device 600b to provide service and/or replacement of the smart device 600b. The resource management device 800b generates a secured request based on the resource management application 856 embedded in the resource management device 800 and transmits the secured request to the resource reallocation system 400 using interface 810 over network 150. Upon receiving and recognizing the secured request, the resource reallocation system 400 may generate a message to the host entity system 900 based upon the terms with the user and/or custodian. The message is received by the host entity system 900 and the host entity system may send a targeted communication to the custodian of smart device 600*b* to regarding the service need of the custodian.

As also shown in FIG. 1, the smart device 600*c* may include a device that is used with a renewable product. Example embodiments of such devices and systems include water filtration systems that require new filters; water softener systems that require salt; appliances such as washing machines, dryers, dishwashers, and the like that require detergent, bleach, fabric softeners and the like; HVAC systems that require air filters; automobiles, boats, trucks and other vehicles that require oil, filters, light bulbs or the like. Other examples of such systems are smart home/building systems where systems such as HVAC, security systems, utilities, lighting, or the like may include interconnected smart devices that may include one or more of the devices discussed above. In a smart system the renewable product may include one or more of the renewable products discussed above in addition to other renewable products such as light bulbs, trash can liners, food, batteries or any renewable product. The smart device 600*c* may also include devices such as a refrigerator that monitors food usage, a trash can that monitors trash bag liner usage, a home electrical smart grid, smart lamps, or light fixtures that monitor light bulb operation or other devices and systems. The embodiments described above are by way of example only and a wide variety of devices and systems may be used in the system of the invention.

Typically the smart device 600*c* may include one or more sensors 641 that detect or determine a status of the renewable product or the smart device may include program logic in operating application 655 and/or resource management application 656 that estimates the status of the renewable product. The smart device 600*c* may include a sensor 641 that directly monitors the status of the renewable product. For example, in a water filtration system the sensor 641 may monitor the water flow rate through the water filter; in a HVAC system the sensor 641 may monitor the air flow rate through the air filter; in a lighting system the sensor 641 may monitor the current drawn by a light bulb in a fixture; in a refrigerator the sensor 641 may monitor the weight of a gallon of milk. The embodiments described above are by way of example only and are not intended to be limiting and a wide variety of devices and systems may be used in the system of the invention. In other embodiments, the status of the renewable product may be determined by program logic rather than the direct monitoring of the renewable product. For example, the status of the renewable product may be based on time intervals, usage rates, or the like. For example, in an HVAC system or water filtration system the replacement of a filter may be determined by a calculation of hours of usage rather than flow rate through the filter; in a "smart refrigerator" food may be evaluated based on time intervals (e.g. a carton of milk ordered every week) rather than on direct testing of the product. The host entity 1001 may include any entity having a host entity system 1002 from which the smart device 600*c* can order the renewable product over network 150 and/or from which the smart device can receive maintenance, repair, or other services. For example the host entity may include a service business with an on-line presence, an e-commerce site, a dedicated web site, a host entity web site or the like.

In systems that use a renewable product such as those described above, the smart device 600*c* may order periodic service (such as the delivery and/or installation of replacement products) when replacement of the renewable product is determined by the smart device 600*c* and/or the resource management device 800*c*. The order may be placed by the smart device 600*c* to a host entity system 1002 of host entity 1001. The host entity may be a dedicated source of the renewable product, such as a water filtration system manufacturer/operator that provides replacement water filters, or the host entity may be an on-line retailer that is unrelated to the smart machine other than acting as the source of the renewable product. In either event the smart device 600*c* is in machine to machine communication with the host entity system 1002 of the host entity selling or providing the renewable product over network 150. The smart device 600*c* is also in machine to machine communication with resource management device 800*c* over communication interfaces 670, 830. The operating application 655 of the smart device 600*c* initiates the order for the appropriate service and/or renewable product. The order may be based on the output of a sensor or program logic. When the smart device determines that a renewable is needed or that service may be necessary, the resource management application 856 of resource management device 800*c* causes a message to be transmitted over the communication interfaces 670, 830 for the resource management device to send a secured request, such as a token, to the resource reallocation system 400. The secured request is received by the resource reallocation system 400 and the order for the renewable and/or service is made from the resource reallocation system to the host entity system 1002 over network 150 upon receipt of the token.

In addition to the communications from the resource management device 800 to the financial institution, the system may allow communication to the resource management device 800 such that the user, custodian, and/or resource reallocation system may direct the resource management options. For example, the custodian may set limits on the frequency with which a financial institution may cause targeted communications be initiated between a host entity and the custodian. Such limits may be based on the type of smart device, the perceived severity of the service or replacement need, plans established by the custodian and shared with the financial institution, and other factors. The user and/or custodian may directly communicate with the resource management device 800 over network 150 using computing device 120 or the user instructions may be communicated to the resource reallocation system 400 from the user such as by computing device 120 over network 150 and the resource reallocation system 400 may communicate with the smart device over network 150. In some embodiments the limits or controls put on the resource management device 800 may originate with the resource reallocation system 400 such that the resource management may be controlled at least in part by the resource reallocation system 400.

Although the resource reallocation system 400 may receive usage information, diagnostic information, maintenance information, and other information from a resource management device as described above, such information may alternatively be received by the resource reallocation system 400 from a smart device, a computing device 120 of a smart device custodian, or from host entity. In one exemplary embodiment, a user/custodian may directly register a smart device with the resource reallocation system 400 such that the resource reallocation system 400 can recognize such smart device as belonging to that user and can establish secure communications with such smart device. In another exemplary embodiment, a computing device 120 of user/custodian may be configured to receive information from a smart device (e.g., via a resource management application). The user/custodian may register the smart device and computing device 120 with the resource reallocation system 400 such that the resource reallocation system 400 can recognize such smart device and computing device 120 as belonging to that user and can establish secure communications with such computing device 120 (e.g., to receive information about the smart device). In yet another exemplary embodiment, a host entity system of a host entity may receive information from a smart device. The user/custodian of the smart device may register the smart device with the resource reallocation system 400 such that the resource reallocation system 400 can recognize such smart device as belonging to that user. Based on this registration, the resource reallocation system 400 may establish a secure communications with the host entity system to receive information about the smart device.

FIG. 7 depicts a method 1100 of providing resource reallocation based on a custodian event in accordance with the present invention. The steps described with respect to FIG. 7 are typically performed by the resource reallocation system 400, but may be performed by other devices or systems described herein.

Initially, a plan for reallocating resources following a custodian event is developed. Accordingly, at block 1102, resources of a custodian are identified. Typically, the custodian is a user who has an account with an entity (e.g., a financial institution) that operates the resource reallocation system 400. As noted, the resources of the custodian may be any property that is owned or otherwise maintained by the custodian. For example, resources of the custodian may include accounts (e.g., a checking account, savings account, or investment account) of the custodian that are maintained by the entity, accounts of the custodian that are maintained by other entities (e.g., other financial institutions), an insurance policy of the custodian, and/or personal property of the custodian, such as smart devices. In some embodiments, the custodian may identify resources to the resource reallocation system 400. For example, the custodian may identify to the resource reallocation system 400 accounts maintained by other entities. In further embodiments, the resources may be automatically identified by the entity. For example, accounts of the custodian that are maintained by the entity may be automatically identified. In addition, a mobile or online banking application on a computing device (e.g., computing device 120) of the custodian may be configured to automatically identify nearby smart devices (e.g., by identifying smart devices connected to the same network as the computing device) and communicate this information to the resource reallocation system 400. In some embodiments, resources of the custodian may be identified based on transactions or other information collected by the resource reallocation system 400. For example, an insurance account of the custodian may be identified based on the custodian using an account maintained by the entity to make regular payments related to the insurance policy. In addition, consumer goods purchased by the custodian may be identified using transaction data collected by the entity. In some embodiments, the resource reallocation system 400 may be configured to prompt the custodian to confirm any resources automatically identified by the resource reallocation system 400 should be subject to a resource reallocation plan.

Next, at block 1104, the resources of the custodian are allocated to one or more resource blocks. As used herein, a "resource block" refers to a group of resources subject to the same resource reallocation rules. For example, all of the resources within a particular resource block might be assigned to the same individual following a particular custodian event. Accordingly, if the custodian wishes to transfer a first group of resources to a first individual and a second group of resources to a second individual upon the occurrence of a particular custodian event (e.g., the death of the custodian), then the custodian might allocate the first group of resources to a first resource block and the second group of resources to a second resource block. Accordingly, the resource reallocation system 400 is typically configured to allow the custodian to specify which resources should be assigned to each resource block. That said, in some embodiments, the resource reallocation system 400 may be configured to initially allocate the resources to one or more resource blocks based on one or more defined allocation templates. Thereafter, the custodian may either accept or modify such allocation of resources. In some embodiments, the resource reallocation system 400 may be configured to initially allocate the resources to one or more resource blocks based on one or more defined (e.g., predefined) allocation templates in response to information collected about the custodian. For example, the resource reallocation system 400 may be configured to provide questions to the custodian, the answers to which may allow the resource reallocation system 400 to ascertain relevant characteristics regarding the custodian. Other information, such as account information and transaction information, may also be useful in ascertaining relevant custodian characteristics. By way of example, the resource reallocation system 400 may be able to use collected information to determine that the custodian is married and, accordingly, recommend allocating or initially allocate the custodian's resources to a resource block defining the spouse as the recipient upon the occurrence of a particular custodian event. By way of further example, resource reallocation system 400 may be able to use collected information to determine that the custodian is unmarried but has two children and, accordingly, recommend allocating or initially allocate the custodian's resources between two resource blocks, each resource block defining one child as the recipient upon the occurrence of a particular custodian event.

In some embodiments, different types of resources may be allocated to different resource blocks. For example, personal resources of the custodian may be allocated to one or more first resource blocks, and resources associated with a business of the custodian may be allocated to one or more second resource blocks.

At block 1106, one or more resource transfer protocols are linked with each resource block. Typically, each resource transfer protocol includes rules for defining those events that should occur upon the occurrence of a particular custodian event. In addition to defining those events that should occur upon the occurrence of a particular custodian event, each resource transfer protocol will typically specify the recipient(s), if any, of resources in a resource block following the occurrence of a particular custodian event. In some embodiments, a resource transfer protocol may be configured to transfer resources allocated to a resource block. For example, a resource transfer protocol may indicate that resources allocated to a particular resource block should be transferred to a defined recipient, such as a spouse, upon the death of the custodian. By way of further example, upon the occurrence of a significant health event (e.g., the custodian becoming disabled or being admitted to an assisted living facility), the resource transfer protocol may be configured to automatically pay bills of the custodian and/or appoint a defined individual as an administrator of the custodian's accounts. In some embodiments, rather than transferring a particular custodian account, the resource transfer protocol may be configured to perform other actions with such custodian account upon the occurrence of a particular custodian event. For example, the resource transfer protocol may be configured to modify email accounts of the custodian to generate automated messages following the occurrence of a particular custodian event, such as a significant health event. By way of further example, the resource transfer protocol may be configured to modify calendar accounts (e.g., to cancel scheduled events) of the custodian following the occurrence of a particular custodian event, such as the custodian moving to a different city or state. In some embodiments, a resource transfer protocol may be configured to acquire resources upon the occurrence of a particular custodian event. For example, upon the birth or adoption of a child of the custodian, the resource transfer protocol may be configured to automatically (i) open an account, such as a savings account or an investment account (e.g., an account associated with a 529 plan), to be administered by the custodian for the benefit of the child, (ii) notify the custodian (e.g., via the computing device 120) that the account has been opened, and (iii) recommend that the custodian make contributions to the account. In some embodiments, a resource transfer protocol may be configured to transmit commands to smart devices of the custodian (e.g., instructions to cause a smart device activate, deactivate, or perform another function, such as changing settings on the smart device). By way of example, upon the occurrence of the death of the custodian, the resource transfer protocol may be configured to transmit a deactivation commands to the smart devices of the custodian. By deactivating unused smart devices, degradation of such smart devices may be reduced, and costs associated with using such smart devices can be avoided. By way of further example, upon the birth or adoption of a child, the resource transfer protocol may be configured to transmit a command to a particular smart device that causes such smart device to order additional renewable products. In some embodiments, a resource transfer protocol may be configured to automatically generate and populate any forms required to transfer resources or otherwise perform events defined in such resource transfer protocol. For example, upon the death of the custodian, the resource transfer protocol may be configured to generate and populate forms required for the administration of the custodian's estate. Data collected by the resource reallocation system 400 may be used to populate any forms. The resource reallocation system 400 is typically configured to allow the custodian to define the rules (e.g., events and recipients) associated with each resource transfer protocol. That said, in some embodiments the resource reallocation system 400 may be configured to initially link a resource transfer protocol with each resource block based on one or more defined templates. Thereafter, the custodian may either accept or modify such resource transfer protocol(s). In some embodiments, the resource reallocation system 400 may be configured to initially define one or more resource transfer protocols in response to information collected about the custodian. For example, the resource reallocation system 400 may be able to use information collected about the custodian to determine that the custodian is married and define (i) a resource transfer protocol that automatically transfers each resource block to the custodian's spouse upon the custodian's death and (ii) a resource transfer protocol that automatically opens an investment account upon the birth of a child.

In one embodiment, a resource transfer protocol may define one or more contingency recipients for a resource block to whom the resources allocated to the resource block may be transferred in the event a primary designated recipient is unable to receive such resources.

Typically, different resource transfer protocols are created for different custodian events. For example, one resource transfer protocol may address those activities that should occur upon the death of the custodian, and another resource transfer protocol may address those activities that should occur upon a change in marital status. In addition, because the custodian may want to transfer resources to different recipients, one resource transfer protocol may be created for those resource blocks that should be transferred to a first recipient, and another resource transfer protocol may be created for those resource blocks that should be transferred to a second recipient.

In some embodiments, the custodian may be required to authenticate their identity to the resource reallocation system 400 (e.g., by providing a username and password) before being able to interact with the resource reallocation system 400 to create a plan for reallocating resources (e.g., allocating resources to resource blocks and establishing resource transfer protocols). In other embodiments, the custodian may be required to authenticate their identity to the resource reallocation system 400 to approve/verify a created plan for reallocating resources. In yet further embodiments, the custodian may be required to (i) initially authenticate their identity before interacting with the resource reallocation system 400 to create a plan for reallocating resources and (ii) provide secondary authentication (e.g., a personal identification number, biometric information, an answer to a challenge question, or the like) to confirm/implement the created plan.

Once the plan for reallocating resources has been established, the custodian may be able to modify the plan. For example, the custodian may be able to change the rules associated with a resource transfer protocol, add or remove resource transfer protocols, change (e.g., add or remove) the resources assigned to a resource block, add or remove resource blocks, split existing blocks between different recipients, and the like. In some embodiments, the resource reallocation system 400 may be configured to regularly request that the custodian verify the existing the plan for reallocating resources, thus providing an opportunity for the custodian to modify the plan based on any change in circumstances.

Once the plan for reallocating resources has been established, at block 1108, custodian data is monitored (e.g., continuously monitored) in order to identify when a custodian event occurs. In this regard, the resource reallocation system 400 will typically establish a communication channel with the network 150 in order to collect and analyze data regarding the custodian that can be used to determine when a custodian event has occurred. In some embodiments, the resource reallocation system 400 is configured to collect data, such as transaction data from other entity systems. For example, a change in the custodian's transaction pattern may indicate that a custodian event has occurred. In some embodiments, the resource reallocation system 400 is configured to collect data from one or more third party systems. For example, the resource reallocation system 400 may collect transaction data from third party financial institutions. By way of further example, the resource reallocation system 400 may collect data from social networking systems. In this regard, a change in the custodian's social network relationships may indicate that a custodian event has occurred (e.g., a change in marital status). In addition, information posted to the social networking system by the custodian or third parties and subsequently collected by the resource reallocation system 400 may indicate that a custodian event has occurred. By way of further example, the resource reallocation system 400 may collect data (e.g., birth certifications, marriage certificates, death certificates, and the like) from governmental systems, which may be used to identify custodian events. In some embodiments, the custodian may provide the resource reallocation system 400 with credentials associated with accounts between the custodian and third parties, thus allowing the resource reallocation system 400 to collect and analyze data associated with such third party accounts (e.g., an account with a third party financial institution or an account with a social networking system). In addition to collecting data from particular third parties, the resource reallocation system 400 may be configured to collect and analyze public data available on the Internet. The data collected by the resource reallocation system 400 is typically parsed and analyzed (e.g., to identify relevant key words, such as "marriage," "married," "born," "birth," "death," "died," "divorce," and the like) to identify if a custodian event has occurred.

In some embodiments, the resource reallocation system 400 may be configured to collect and analyze data from smart devices of the custodian (e.g., via a secure communication channel) in order to identify if a custodian event. In this regard, a change in the usage patterns of smart devices may indicate that a custodian event has occurred. For example, if the data indicates that smart device's in the custodian's residence are no longer being used, then the custodian may have died or moved to a different residence. By way of further example, location data collected from customer devices (e.g., a smartphone) may indicate that the customer has relocated. In yet another example, biometric information collected by one or more smart devices may indicate that the custodian has experienced a significant health event.

At block 1110, based on monitoring the customer data, the resource reallocation system 400 determines that a custodian event has occurred. In some embodiments, in response to identifying a custodian event, the resource reallocation system 400 may automatically transmit a request to the custodian, an individual designated by the custodian (e.g., a designated recipient), or to administrative personnel of the entity to confirm that the determined custodian event has occurred. For example, the resource reallocation system 400 may transmit a command to the computing device 120 of the custodian (or other designated individual) that causes an online banking application to display a graphical user interface configured to allow the custodian to confirm or reject the occurrence of the determined custodian event. In one embodiment, if an individual designated to confirm a custodian event does not respond, then one or more designated contingency individuals may be contacted to confirm the custodian event. By way of example, if a custodian does not respond within a defined period of time to a request to confirm a particular custodian event, a communication may be sent to the custodian friends on a social networking system to confirm the custodian event. Although the custodian event is typically determined based on monitoring the customer data, the resource reallocation system 400 may be configured to allow the custodian, an individual designated by the custodian, or to administrative personnel of the entity to specify that a particular custodian event has occurred.

In response to determining that a custodian event has occurred, the resource reallocation system 400 will typically initiate each resource transfer protocol associated with the determined custodian event. For example, the resource reallocation system 400 may transfer resources allocated to a resource block to a recipient as defined in a corresponding resource transfer protocol. In this regard, the resource reallocation system 400 will typically determine which resource transfer protocol(s) is/are associated with the determined custodian event, and then perform those events/activities specified by each such resource transfer protocol.

In some embodiments, the resource reallocation system 400 may require a recipient to verify their identity prior to initiating the transfer of resources to such recipient. For example, the recipient may provide a username, password, digital signature, and/or any other information that can be used to verify the identity of the recipient.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized resource reallocation system, comprising:
    a computer apparatus including a processor, a memory, and a network communication device;
    a resource management module stored in the memory, executable by the processor, and configured for:
        identifying resources of a custodian, wherein the resources comprise a smart device;
        allocating the resources into a first resource block;
        linking a first resource transfer protocol to the first resource block, the first resource transfer protocol being associated with a first custodian event;
        establishing a secure communication channel with the smart device via the network communication device;
        monitoring custodian data from the smart device via the network communication device, wherein the monitored custodian data comprises biometric information collected by the smart device;
        determining that the first custodian event has occurred based on the biometric information collected by the smart device; and
        in response to determining that the first custodian event has occurred, automatically initiating the resource transfer protocol, wherein initiating the resource transfer protocol comprises transmitting instructions over the secure communication channel to the smart device via the network communication device, the instructions being configured to cause the smart device to deactivate.

2. The computerized resource reallocation system according to claim 1, wherein the instructions are configured to cause the smart device to change one or more settings.

3. The computerized resource reallocation system according to claim 1, wherein initiating the resource transfer protocol comprises initiating a transfer of the resources in the first resource block to a new custodian, the new custodian being defined in the first resource transfer protocol.

4. The computerized resource reallocation system according to claim 3, wherein:
    the resource management module is configured for verifying an identity of the new custodian; and
    initiating the transfer of the resources in the first resource block to the new custodian is based on verifying the identity of the new custodian.

5. The computerized resource reallocation system according to claim 1, wherein initiating the resource transfer protocol comprises procuring a new resource for the custodian.

6. The computerized resource reallocation system according to claim 1, wherein:
    the resources of the custodian comprise a second smart device; and
    initiating the resource transfer protocol comprises transmitting second instructions to the second smart device via the network communication device, the second instructions being configured to cause the second smart device to order a renewable product.

7. A computer program product for providing resource reallocation comprising a non-transitory computer-readable storage medium having computer-executable instructions for:
- identifying resources of a custodian, wherein the resources comprise a smart device;
- allocating the resources into a first resource block;
- linking a first resource transfer protocol to the first resource block, the first resource transfer protocol being associated with a first custodian event;
- establishing a secure communication channel with the smart device via a network communication device;
- monitoring custodian data from the smart device via the network communication device, wherein the monitored custodian data comprises biometric information collected by the smart device;
- determining that the first custodian event has occurred based on the biometric information collected by the smart device; and
- in response to determining that the first custodian event has occurred, automatically initiating the resource transfer protocol, wherein initiating the resource transfer protocol comprises transmitting instructions over the secure communication channel to the smart device via the network communication device, the instructions being configured to cause the smart device to deactivate.

8. The computer program product according to claim 7, wherein the instructions are configured to cause the smart device to change one or more settings.

9. The computer program product according to claim 7, wherein initiating the resource transfer protocol comprises initiating a transfer of the resources in the first resource block to a new custodian, the new custodian being defined in the first resource transfer protocol.

10. The computer program product according to claim 9, wherein:
- the non-transitory computer-readable storage medium has computer-executable instructions for verifying an identity of the new custodian; and
- initiating the transfer of the resources in the first resource block to the new custodian is based on verifying the identity of the new custodian.

11. The computer program product according to claim 7, wherein initiating the resource transfer protocol comprises procuring a new resource for the custodian.

12. The computer program product according to claim 7, wherein:
- the resources of the custodian comprise a second smart device; and
- initiating the resource transfer protocol comprises transmitting second instructions to the second smart device via the network communication device, the second instructions being configured to cause the second smart device to order a renewable product.

13. A computerized method for providing resource reallocation, comprising:
- identifying, via a computer processor, resources of a custodian, wherein the resources comprise a smart device;
- allocating, via a computer processor, the resources into a first resource block;
- linking, via a computer processor, a first resource transfer protocol to the first resource block, the first resource transfer protocol being associated with a first custodian event;
- establishing, via a computer processor, a secure communication channel with the smart device via a network communication device;
- monitoring, via a computer processor, custodian data from the smart device via the network communication device, wherein the monitored custodian data comprises biometric information collected by the smart device;
- determining, via a computer processor, that the first custodian event has occurred based on the biometric information collected by the smart device; and
- in response to determining that the first custodian event has occurred, automatically initiating, via a computer processor, the resource transfer protocol, wherein initiating the resource transfer protocol comprises transmitting instructions over the secure communication channel to the smart device via the network communication device, the instructions being configured to cause the smart device to deactivate.

14. The computerized method according to claim 13, wherein the instructions are configured to cause the smart device to change one or more settings.

15. The computerized method according to claim 13, wherein initiating the resource transfer protocol comprises initiating a transfer of the resources in the first resource block to a new custodian, the new custodian being defined in the first resource transfer protocol.

16. The computerized method according to claim 15, comprising verifying an identity of the new custodian, wherein initiating the transfer of the resources in the first resource block to the new custodian is based on verifying the identity of the new custodian.

17. The computerized method according to claim 13, wherein initiating the resource transfer protocol comprises procuring a new resource for the custodian.

18. The computerized method according to claim 13, wherein:
- the resources of the custodian comprise a second smart device; and
- initiating the resource transfer protocol comprises transmitting second instructions to the second smart device via the network communication device, the second instructions being configured to cause the second smart device to order a renewable product.

* * * * *